United States Patent
Vardhan

(10) Patent No.: US 9,854,456 B2
(45) Date of Patent: Dec. 26, 2017

(54) METHOD AND APPARATUS FOR MANAGING MULTI-HOP RELAY NETWORKS

(71) Applicant: QUALCOMM Incorporated, San Diego, CA (US)

(72) Inventor: Anurag Vardhan, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 126 days.

(21) Appl. No.: 14/015,948

(22) Filed: Aug. 30, 2013

(65) Prior Publication Data

US 2014/0341105 A1 Nov. 20, 2014

Related U.S. Application Data

(60) Provisional application No. 61/824,335, filed on May 16, 2013.

(51) Int. Cl.
*H04W 24/02* (2009.01)
*H04W 48/16* (2009.01)
*H04W 88/04* (2009.01)
*H04W 40/24* (2009.01)

(52) U.S. Cl.
CPC .......... *H04W 24/02* (2013.01); *H04W 48/16* (2013.01); *H04W 40/24* (2013.01); *H04W 88/04* (2013.01)

(58) Field of Classification Search
CPC ..... H04W 24/02; H04W 8/005; H04W 40/02; H04W 40/24; H04W 40/34; H04W 48/16; H04W 48/20; H04W 68/005; H04W 76/068; H04W 88/04

USPC .................................................. 370/315, 338
See application file for complete search history.

(56) References Cited

U.S. PATENT DOCUMENTS

| | | | |
|---|---|---|---|
| 6,633,862 B2 | 10/2003 | Thompson | |
| 6,775,258 B1* | 8/2004 | van Valkenburg | H04L 45/00 370/338 |
| 8,315,570 B2 | 11/2012 | Arbel | |
| 2004/0103282 A1* | 5/2004 | Meier | G06Q 20/3674 713/171 |

(Continued)

OTHER PUBLICATIONS

Perkins, C. et al., "Ad hoc On-Demand Distance Vector (AODV) Routing", Jul. 2003, www.ietf.org, Network Working Group Request for Comments: 3561, pp. 2-11.*

*Primary Examiner* — Jeffrey M Rutkowski
*Assistant Examiner* — Shah Rahman
(74) *Attorney, Agent, or Firm* — Arent Fox LLP

(57) ABSTRACT

Various aspects of an approach for managing multi-hop networks are described herein for an apparatus associated with a network that includes detecting, by the apparatus, an event corresponding to a state of association of a first device with the network; updating at least one network parameter based on the detection of the event; and generating a notification based on the update of the at least one network parameter. Another aspect of the disclosed approach includes receiving, by the apparatus, a first notification corresponding to a state of association of a first device with the network, wherein the first notification comprises a first timestamp corresponding to the state of association of the first device; comparing the first timestamp with a second timestamp corresponding to a table stored by the apparatus; and, updating the table with the first timestamp if the first timestamp is more recent than the second timestamp.

43 Claims, 18 Drawing Sheets

(56) References Cited

U.S. PATENT DOCUMENTS

| | | | |
|---|---|---|---|
| 2005/0003330 A1* | 1/2005 | Asgarinejad | G09B 7/02 434/20 |
| 2005/0063307 A1* | 3/2005 | Samuels et al. | 370/235 |
| 2005/0254503 A1* | 11/2005 | Claseman | H04L 12/4625 370/395.41 |
| 2006/0089765 A1* | 4/2006 | Pack | G05D 1/0061 701/23 |
| 2006/0173959 A1* | 8/2006 | McKelvie | H04L 12/581 709/204 |
| 2007/0058568 A1* | 3/2007 | Previdi | H04L 45/50 370/254 |
| 2007/0127503 A1* | 6/2007 | Zhao | 370/400 |
| 2007/0146802 A1* | 6/2007 | Ushida | H04N 1/00214 358/402 |
| 2007/0248067 A1* | 10/2007 | Banerjea et al. | 370/338 |
| 2008/0045247 A1* | 2/2008 | Wilson | H04M 3/487 455/466 |
| 2008/0186869 A1* | 8/2008 | Jeon et al. | 370/252 |
| 2008/0222478 A1* | 9/2008 | Tamaki | H04L 1/18 714/749 |
| 2009/0113471 A1 | 4/2009 | Bouazizi et al. | |
| 2010/0238826 A1* | 9/2010 | Borran et al. | 370/252 |
| 2011/0040623 A1 | 2/2011 | Lauwers et al. | |
| 2011/0065437 A1* | 3/2011 | Shimizu | H04W 76/028 455/436 |
| 2012/0002537 A1* | 1/2012 | Bao et al. | 370/221 |
| 2012/0311290 A1 | 12/2012 | White | |
| 2013/0246641 A1* | 9/2013 | Vimpari | H04L 47/10 709/228 |
| 2013/0295921 A1* | 11/2013 | Bhargava | H04W 48/20 455/426.1 |

* cited by examiner

| Field: | Element ID | Length | No. of Addresses | Addresses+Timestamps |
|---|---|---|---|---|
| Size: | 1-octet | 1-octet | 1-octet | variable |
| Description: | <allocate new value> | <variable> | <number of Addresses that follow> | [multiple: <48-bit MACiD>-<timestamp>] |

Format of *Relay_Reachable_Address* IE

FIG. 5

| Field: | Category | Type | No. of Addresses | Addresses+Timestamps |
|---|---|---|---|---|
| Size: | 1-octet | 1-octet | 1-octet | variable |
| Description: | Relay | 0 | <number of Addresses that follow> | [multiple: <48-bit MACID>-<timestamp>] |

Format of *Relay Reachable Address Action Frame*

*FIG. 6*

METHOD AND APPARATUS FOR MANAGING MULTI-HOP RELAY NETWORKS

CROSS-REFERENCE TO RELATED APPLICATIONS

This application claims priority to and the benefit of U.S. provisional patent application No. 61/824,335, filed in the United States Patent and Trademark Office on May 16, 2013, the entire content of which is incorporated herein by reference.

BACKGROUND

Field

Aspects of the disclosed approach relate generally to wireless communications, and more specifically, to a method and apparatus for managing multi-hop relay networks.

Background

In many telecommunications systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), or personal area network (PAN). Networks also differ according to the switching/routing technique used to interconnect the various network nodes and devices, examples of which may include circuit switching and packet switching; the type of physical media employed for transmission, examples of which may include wired and wireless transmission media; and the set of communication protocols used, examples of which may include the Internet protocol suite, SONET (Synchronous Optical Networking), Ethernet, etc.

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

The devices in a wireless network may transmit/receive information between each other. Typically, however, the devices on a wireless network may have a limited transmission range. Thus, improved systems, methods, and devices for communicating in a wireless network are desired.

BRIEF DESCRIPTION OF THE DRAWINGS

FIG. 5 is a diagram of an information element for allowing the relay of FIG. 4 to report a list of addresses reachable through the relay in accordance with various aspects of the disclosure, including during a transmission of an association request frame to an upstream relay or access point.

FIG. 6 is a diagram of a frame for allowing the relay of FIG. 4 to report a list of addresses reachable through the relay in accordance with various aspects of the disclosure.

Figure 1:
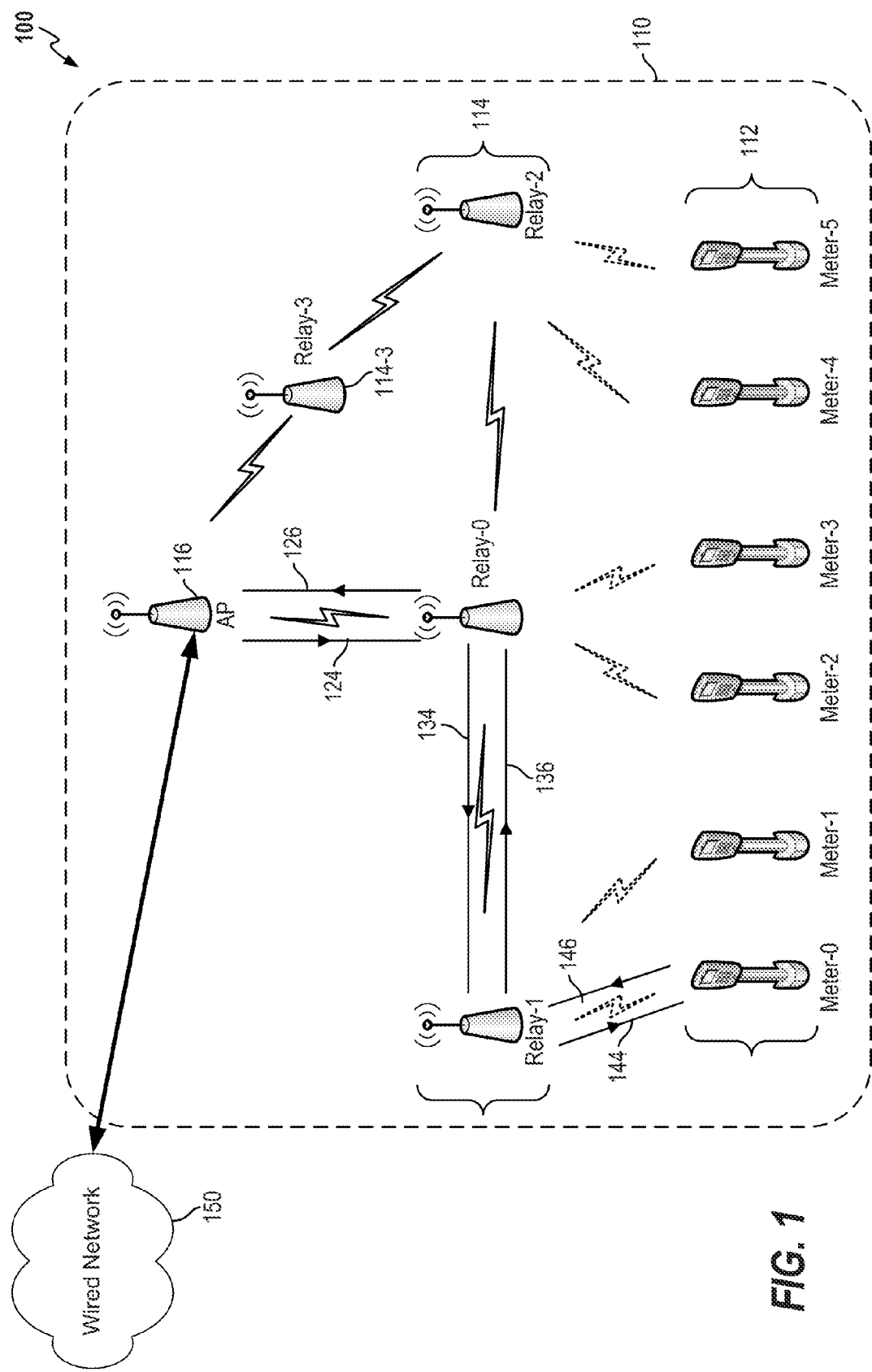
FIG. 1 is a block diagram of a communications scenario in which various aspects of applying a disclosed approach for managing multi-hop relay networks may be understood.

In accordance with common practice, some of the drawings may be simplified for clarity. Thus, the drawings may not depict all of the components of a given apparatus (e.g., device) or method. Finally, like reference numerals may be used to denote like features throughout the specification and figures.

SUMMARY

The following presents a simplified summary of one or more aspects of the disclosed approach, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

An aspect of the disclosed approach provides a method of wireless communication for an apparatus associated with a network that includes detecting, by the apparatus, an event corresponding to a state of association of a first device with the network; updating, by the apparatus, at least one network parameter based on the detection of the event; and generating, by the apparatus, a notification based on the update of the at least one network parameter.

Another aspect of the disclosed approach provides a method of wireless communication for an apparatus associated with a network that includes receiving, by the apparatus, a first notification corresponding to a state of association of a first device with the network, wherein the first notification comprises a first timestamp corresponding to the state of association of the first device; comparing, by the apparatus, the first timestamp with a second timestamp corresponding to a table stored by the apparatus; and, updating, by the apparatus, the table with the first timestamp if the first timestamp is more recent than the second timestamp.

Yet another aspect of the disclosed approach provides an apparatus associated with a network that includes means for detecting an event corresponding to a state of association of a first device with the network; means for updating at least one network parameter based on the detection of the event; and means for generating a notification based on the update of the at least one network parameter.

Still another aspect of the disclosed approach provides an apparatus associated with a network that includes means for receiving a first notification corresponding to a state of association of a first device with the network, wherein the first notification comprises a first timestamp corresponding to the state of association of the first device; means for comparing the first timestamp with a second timestamp corresponding to a table stored by the apparatus; and; means for updating the table with the first timestamp if the first timestamp is more recent than the second timestamp.

Still yet another aspect of the disclosed approach provides a computer program product for wireless communications that includes a computer-readable storage medium including instructions executable by an apparatus associated with a network for detecting, by the apparatus, an event corresponding to a state of association of a first device with the network; updating, by the apparatus, at least one network parameter based on the detection of the event; and generating, by the apparatus, a notification based on the update of the at least one network parameter.

Still yet another aspect of the disclosed approach provides a computer program product associated with a network that includes a computer-readable storage medium including instructions executable by an apparatus associated with a network for receiving, by the apparatus, a first notification corresponding to a state of association of a first device with the network, wherein the first notification comprises a first timestamp corresponding to the state of association of the first device; comparing, by the apparatus, the first timestamp with a second timestamp corresponding to a table stored by the apparatus; and; updating, by the apparatus, the table with the first timestamp if the first timestamp is more recent than the second timestamp.

Still yet another aspect of the disclosed approach provides an apparatus associated with a network that includes a processing system configured to detect an event corresponding to a state of association of a first device with the network; update at least one network parameter based on the detection of the event; and generate a notification based on the update of the at least one network parameter.

Still yet another aspect of the disclosed approach provides an apparatus associated with a network that includes a receiver configured to receive a first notification corresponding to a state of association of a first device with the network, wherein the first notification comprises a first timestamp corresponding to the state of association of the first device; and a processing system coupled to the receiver. The processing system is configured to compare the first timestamp with a second timestamp corresponding to a table stored by the apparatus; and update the table with the first timestamp if the first timestamp is more recent than the second timestamp.

These and other aspects of the disclosed approach will become more fully understood upon a review of the detailed description, which follows.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure contained herein, whether implemented independently of or combined with any other aspect of the disclosure. For example, an apparatus may be implemented or a method may be practiced using any number of the aspects set forth herein. In addition, the scope of the disclosure is intended to cover such an apparatus or method that is practiced using other structure, functionality, or structure and functionality in addition to or other than the various aspects of the disclosure set forth herein. It should be understood that any aspect of the disclosure provided herein may be embodied by one or more elements of a claim.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Popular network technologies may include various types of wireless networks. A wireless LAN (WLAN) may be used to interconnect devices that are located near each other physically. A wireless WAN (WWAN) such as a wireless MAN (WMAN) may be used to interconnect devices that are located at greater distances from over a kilometer or longer lengths. These wireless networks may employ widely used networking protocols such as those compliant with the protocols and standards promulgated by the Institute of Electrical and Electronic Engineers (IEEE) in the IEEE 802.11 standards. The various aspects described herein may apply to any communication standard, such as any other wireless protocols, and as such the wireless network may include various devices that make up the components that access the wireless network. For example, there may be two types of devices: clients—also referred to as stations (STAs), and access points (APs). In general, a STA acts as a user of the wireless network, and an AP may serve as a hub or base station for the wireless network. In some implementations, as further discussed herein, a STA may also provide some or all of the functionality of an AP. A STA/AP connection may be made via a wireless communications protocol such as that used for establishing an IEEE 802.11-compliant wireless link to obtain general connectivity to the Internet or to other WANs, such as a MAN.

The transmission range of wireless devices that may be used as a STA is typically of a limited distance. To accommodate this deficiency, multiple APs may be positioned such that an AP is within the transmission range of the devices. In wireless networks covering substantial geographic distances, multiple APs may be necessary to ensure that all devices such as the STA can communicate across the wireless network. However, the addition of each AP adds implementation cost. Thus, a wireless network design that reduces the need for additional APs when the wireless network spans a total distance exceeding the transmission range of any two wireless devices yet still allows these wireless devices to communicate across the entire wireless network is desirable.

Certain devices described herein implement an IEEE 802.11 standard that may be used for range extension, currently designated as IEEE 802.11ah. Such devices, whether functioning as a STA, an AP, or another type of device having some combination of the characteristics of STAs and APs, may be used in such applications as smart metering, surveillance, home automation, healthcare, or smart grid networking Such devices may provide sensing functionality, and may be capable of machine-to-machine communications. They may also be used for enabling extended-range Internet connectivity for use with "hotspots".

The IEEE 802.11 ah standard contemplates utilization of frequencies in the range of 900 megahertz (MHz) to achieve long range communication. While a 900 MHz deployment is expected to provide an increased wireless communications range between STAs and an AP, it may not be sufficient for such STAs as low power sensors running on batteries. The problem is exacerbated when barriers are present between the sensors and the AP. Thus, one important potential application of the IEEE 802.11ah standard for range extension is in devices referred to as relays. As described herein, relays are imbued with the functionality of both STAs and APs to facilitate wireless communications between devices over wireless networks that are stretched out over long ranges. In general, STAs and relays may include, or be referred to as, non-AP STAs. In addition, the term "device" as used herein may apply to either STAs or relays, or relays functioning as APs.

In accordance with various aspects of the disclosure, relays may be used in place of an AP because relays may be less expense than APs. For example, some AP designs may include both wireless networking hardware and hardware necessary to interface with traditional wired network-based technologies such as Ethernet. This additional complexity may cause APs to be more expensive than relays. Additionally, because the APs may interface with a wired network, the cost of installing multiple APs goes beyond the cost of the AP itself, and may include wiring, labor and other installation costs associated with installing and configuring a wired network. Use of a relay instead of an AP may reduce some of the costs associated with an AP. For example, because relays may use only wireless communications technologies, designs using relays may provide for reduced implementation cost when compared to AP-only based designs. Additionally, the ability to extend the communication of wireless traffic may reduce the need for and installation expenses associated with wired network cabling for a number of APs.

Systems, methods, and devices for communicating data in a wireless network are described herein, where a number of wireless devices referred to as relays may be associated with an AP. A set of one or more STAs may also be associated with the AP and the relays, where an association between a particular STA and a particular relay may be formed so that the associated relay may provide relay services to the associated STA to facilitate wireless communications between the STA and the AP. Other relays may communicate with the associated relay to form a multi-hop relay network to further facilitate wireless communications between the associated STA and the AP where the associated STA and the AP are located at distances longer than the combined communications ranges of the associated STA, the associated relay, and the AP.

A collection of devices that have successfully associated with the AP, including the STAs and the relays, along with the AP itself may be referred to as a basic service set (BSS). The AP is responsible for controlling the BSS, with the simplest example of a BSS consisting of one AP and one STA, with the next simplest example consisting of one AP and one relay. The term "relay network" may be used to generally refer to a network with one AP; one or more relays; and one or more STAs, organized in a topology with a shape of a tree, with the AP at a base of the tree and the STAs at leaf positions of the tree topology. Relay Network: A network with 1 AP, 1+Relays, 1+STAs organized in tree topology with the AP at the root and STAs at the leaf.

As described above, there may be multiple layers of relays in a relay network between the AP and a STA. In general, each link between the associated STA and the associated relay, two adjacent relays, or any relay adjacent to the AP may be referred as a hop or Relay-Link, and data in the BSS may forwarded from the AP to the STA through one or more relays between the AP and the STA using forwarding tables located on the AP and each relay. In general, the forwarding table has information on the next link a packet should take to finally get to a destination address. In other words, the forwarding table may be used to determine how to route data. A forwarding table may be useful, for example, when a decision with regard to how to forward a packet may be made between two or more links. In general, forwarding tables may be thought of as a next link lookup table or next hop lookup table. In accordance with various aspects of the disclosure, mechanisms for forwarding table management may be implemented in the wireless network to minimize communications issues due to stale or incorrect forwarding tables.

In describing various aspects of the disclosed approach, reference may be made to a first device in the BSS being upstream or downstream with respect to another, second device in the BSS. As used herein, these terms provide reference with respect to how far a particular non-AP STA is located along a unidirectional multi-hop path with respect to another non-AP STA, as measured from a common reference node, which is the AP. Further, the term downlink refers to a unidirectional communications link from the AP to one or more non-AP STAs, while the term uplink refers to a unidirectional communications link from a non-AP STA towards the AP. If the first device is further away from the AP on the multi-hop path than the second device, then the first device is said to be downstream from the second device, with all communications from the first device to the second device being said to go over a downlink. Correspondingly, the second device is said to be upstream from the first device, with all communications from the second device to the first device being said to go over an uplink. Thus, the associated STA described above is may be said to be downstream and receive data on a downlink from the associated relay, and the associated relay may be said to be upstream and receive data on an uplink from the associated STA. Further, any intermediate relay on the multi-hop path between the associated STA and the associated relay may be said to be upstream and receive data on an uplink from the associated STA and the associated relay, and the associated STA and the associated relay may be said to be downstream and receive data on a downlink from any intermediate relay. By definition, all non-AP devices in the BSS are said to be downstream and receive data on a downlink from the AP. All non-AP devices transmit data on an uplink to the AP. Alternatively, downlinks may be referred to as forward links or forward channels, and uplink may be referred to as reverse links or a reverse channels.

Further, as used herein, the terms association or attachment may refer to a device being successfully admitted by an AP to its BSS, whether that device is admitted through communication directly with the AP or passed along to the AP via one or more relays. The time of association may be considered a local event time generated when two devices connect, while the attachment time may be considered a global event when a device becomes reachable from the AP. As further described herein, the association time is reported upstream and may be updated with a local association time at each hop. The last association time reported to the AP is then considered the attachment time. At every hop an updated time may be used to resolve conflicts in the forwarding table.

Conversely, the terms disassociation or detachment may refer to a device losing association or attachment with the BSS, such as where a device loses connectivity with the wireless network formed by the other devices in the BSS for any reason. For example, the device may lose power or be subject to so much interference that communication with the other devices in the BSS may not be satisfactorily maintained. The device may also be purposely disassociated, or detached, from the BSS by being moved out of a coverage area of the BSS. Along those lines, the device may become re-associated, or re-attached, with the BSS if the device is brought within range of the coverage area of the BSS, where the re-association, or re-attachment, does not have to be achieved using the same upstream device through which the device was previously associated, or attached, with the BSS. For example, where the device was previously attached with the BSS through a relay, the device may achieve re-association, and then re-attachment using another relay or the AP.

FIG. 1 illustrates an example of a potential application of the IEEE 802.11ah standard in a communications scenario 100 for a smart metering application that may span very long distances, such as over several city blocks. In the communications scenario 100, a set of parking meters 112 needs to be connected to an AP 116 using a wireless network 110 so they may communicate with a wired network 150. To facilitate this connection, a set of relays 114 is placed in close enough physical proximity of the set of parking meters 112 such that each parking meter of the set of parking meters 112 may be within wireless communications range of and be able to associate with at least one relay in the set of relays 114. Further, the AP 116 is located within a wireless communications range of at least one relay of the set of relays 114, such as relay-0. Thus, a parking meter may attach to and obtain service from a relay in the set of relays 114 that is close to it. A relay in the set of relays 114 that is close enough to the AP 116 may communicate directly with the AP 116 to obtain service from the AP 116. A relay in the set of relays 114 that cannot communicate directly with the AP 116 may obtain service from another relay in the set of relays 114 by associating with it. As illustrated, the set of relays 114 is configured as a multi-hop relay network that supports communication of data and information between the set of parking meters 112 and the AP 116, which ultimately may reach the wired network 150.

To further illustrate the use of the terms upstream/downlink and uplink/downlink as discussed above, a communication link that facilitates transmission from the AP 116 to one or more of the relays 114 may be referred to as a downlink, such as a downlink 124 from the AP 116 to the relay-0, a downlink 134 from the relay-0 to the relay-1, or a downlink 144 from the relay-1 to the meter-0. A communication link that facilitates transmission from one or more of the parking meters in the set of parking meters 112 to the relays 114 or the AP 116 may be referred to as an uplink, such as an uplink 146 from the meter-0 to the relay-1, an uplink 136 from the relay-1 to the relay-0, or an uplink 126 from the relay-0 to the AP 116.

As described herein, a relay may provide service to STAs just like an AP. STAs may thus associate with a relay or the AP in a BSS. A relay also has STA-like capability to establish an association with another relay or the AP. Such an association is referred to as a Relay-Link or a hop. A relay can forward data frames over a Relay-Link. A data frame from a STA may traverse multiple Relay-Links to reach the AP. An address field may be used for Data frames on a Relay-Link to preserve the source and destination address of the Data frame. Problem: Forwarding Tables at different nodes in a multi-hop Relay system can become inconsistent after topology change causing some STAs to be unreachable.

A relay may use information broadcast by other relays and/or the AP to decide with which relay or AP it should establish a Relay-Link. In one aspect of the disclosed approach, a relay establishes a Relay-Link with either only one upstream relay or the AP. A relay or the AP may accept Relay-Links from multiple downstream relays. Hence, relays in a BSS form a tree topology with the AP at the root of the tree. As discussed previously, the AP does not establish any upstream Relay-Links as conceptually it is the first node of the topology. The topology of a BSS changes when a new Relay-Link is established or when a previously established Relay-Link is deleted. Topology determines how data frames flow within the BSS and hence affects the coverage, throughput and latency that a STA experiences.

In a multi-tiered topology configured in accordance with various aspects of the disclosed approach, each relay is capable of connecting to another relay in addition to connecting directly to an AP. If a relay that is actively serving multiple STAs were to find another upstream relay that provides it better communications capabilities, it should break connection with the current relay link and establish connection with the other upstream relay. However, under certain conditions, forwarding tables at different nodes in a multi-hop relay network may become inconsistent after a topology change—causing some STAs to be unreachable.

For example, consider a topology of FIG. 1 where relay-2 has not yet associated with relay-0. In order to provide relay services to a subset of parking meters in the set of parking meters 112, relay-2 may send an association request message to relay-0. Upon a successful association with relay-2, relay-0 may then update its forwarding table and send an update message to the AP 116 for the AP 116 to update its forwarding table to reflect the attachment of relay-2 with the BSS through the relay-0. However, before the update message reaches the AP 116, relay-2 is physically moved such that it may communicate directly with the relay-3 114-3 while still being capable of serving the same parking meters 112. In that case, the relay-2 may request association with the relay-3 114-3 without explicitly informing relay-0 of the change. Consider further that similar to the operation of relay-0, the relay-3 114-3 may update its forwarding table and send an update message to the AP 116 for the AP 116 to update its forwarding table to reflect the attachment of relay-2 with the BSS through the relay-3 114-3. The issue is that the update messages from relay-0 and the relay-3 114-3 are in a race to reach the AP 116. If the update message from relay-0 reaches the AP 116 first, then the update message from the relay-3 114-2 will overwrite the forwarding table entries at the AP 116, which accurately reflects the state of the topology of the network. However, if the update message of the relay-3 114-2 reaches the AP 116 first, then the update message from relay-0 will overwrite the forwarding table entries at the AP 116. The AP 116 now has incorrect forwarding information and may misdirect any communication that it receives for the parking meters associated with the relay-2 until it receives an update to its forwarding table.

Without some form of forwarding table management, there may be no mechanisms for an upstream relay to determine validity of a particular downstream Relay-Link, which may lead to wasted resources and/or lost transmissions. For example, if a STA has become unreachable, any attempted transmission to that STA would consume network resources that may be used for transmissions to STAs that are reachable. In this situation, it would be preferable for the AP to be aware of the disassociation of the STA so that the AP may discard invalid associations. The problem condition may be detected later, but then a previously accepted association has to be dropped. This may cause instability in the BSS. In addition, notification of forwarding table changes to upstream relays should occur as soon as possible to avoid latency when a relay changes its upstream relay.

Another application of the various aspects of the disclosed approach may be for the deployment of a self-organizing relay network to improve coverage in a particular geographic area that does not require user configuration. For example, a user may places multiple relays around a house or an office. These relays may then self-organize to form an extended BSS and extend coverage area. Thus, it is desirable that relays should be capable of self-organizing—creating a multi-hop tree structure if needed—to extend a coverage area of an AP. Relays should also be able to re-organize when one or more intermediate relays between a STA or a relay, and the AP fails. A relay should extend the coverage of an AP and allow legacy STAs to connect to it to reach the AP. The standard STA methods for scanning, association, and authentication should operate with the various aspects of the disclosed approach. STAs should be able to connect to any of the relays or the AP directly using standard methods of serving AP selection. Further, relays should be capable of operating in a low power mode with a small memory size.

In accordance with one aspect of the disclosure, a mechanism is provided to allow the associated relay to generate update messages that update forwarding tables used by the AP and other devices in the multi-hop relay network to forward data to the STA. For example, as further described herein, the associated relay may maintain a timestamp for the STA referred to as a BSS-Attach-Time, and transmit that information in an update message to the AP. Each upstream relays between the associated relay and the AP that receives the update message may update the timestamp in the update message with a new BSS-Attach-Time that is based on a timestamp generated when that particular upstream relay receives the update message before generating a new update message to relay the information. Forwarding table entry conflicts may be resolved by referring to the most recent BSS-Attach-Time.

In accordance with another aspect of the disclosure, another forwarding table management mechanism is provided for detection of a disconnection of the STA or the associated relay—or any other intermediate relay between the STA and the AP, to allow relatively timely update of forwarding tables due to a detachment event related to the STA or a relay from the BSS. For example, detection may be performed in a first, deterministic time period to determine if the STA or a relay is still attached to the BSS. If a detachment event is determined, then a reattachment with the BSS of either the detached STA, or the detached relay and any associated devices for which it provides relay services may be forbidden for a second time period. Various implementations of these time periods may ensure consistency of forwarding tables.

Figure 2:
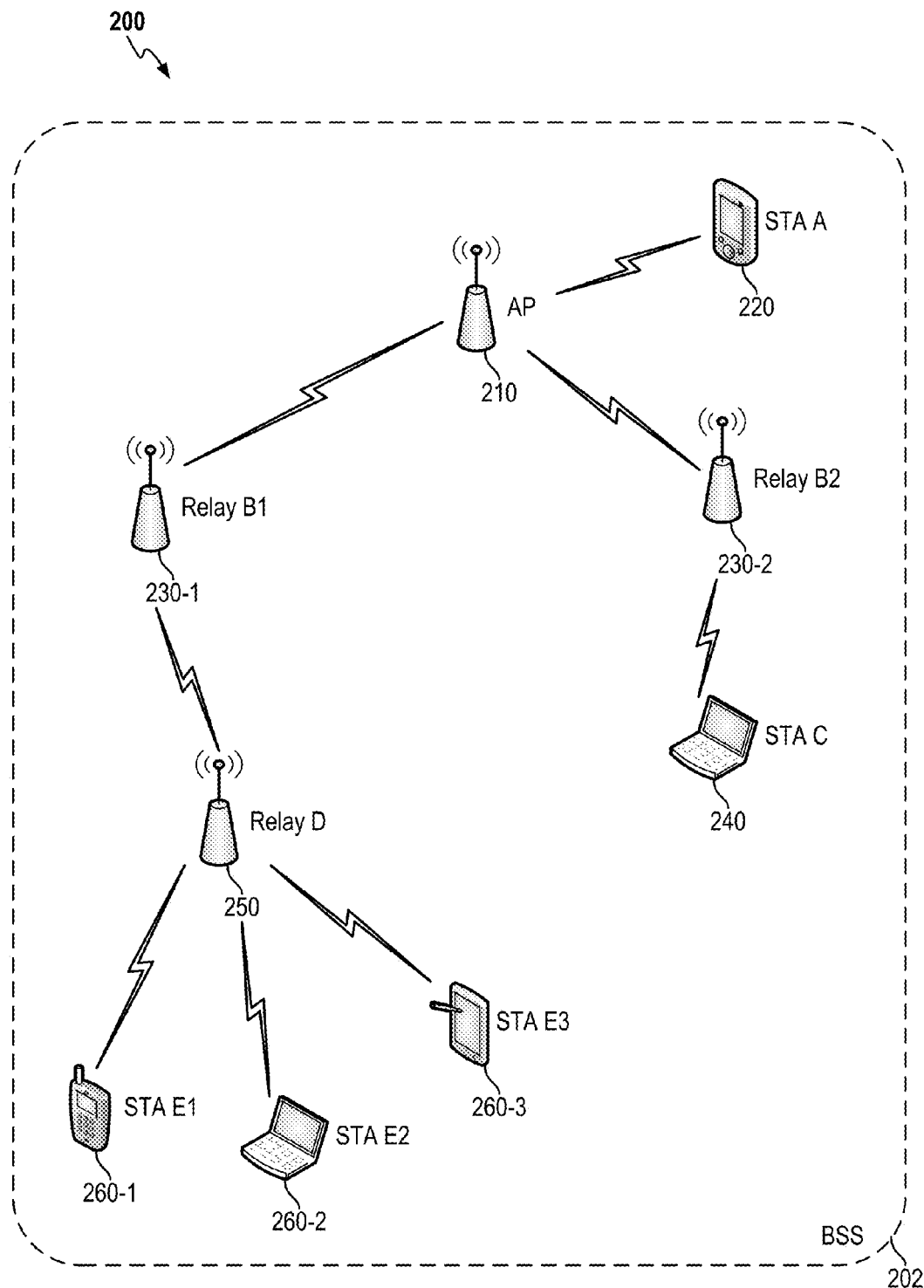
FIG. 2 is a block diagram of a wireless communications system in which various aspects of the disclosed approach for managing multi-hop relay networks may be understood.

FIG. 2 illustrates an exemplary wireless communications system 200 in which various aspects of the disclosures may be implemented. The wireless communications system 200 may operate pursuant to one or more wireless standards such as, for example, the IEEE 802.11 ah standard. The wireless communications system 200 may include an AP 210 that communicates directly with a STA A 220 and a first set of relays including a relay B1 230-1 and a relay B2 230-2. Each of the relays in the first set of relays may communicate with another STA or relay and provide relay services for communicating data to/from those devices. For example, the relay B1 230-1 communicates with a second set of relays including a relay D 250 to provide relay services to that relay and any downstream devices associated therewith, and the relay B2 230-2 communicates with a STA C 240. The relay D 250 itself provides relay services for a set of STAs including a STA E1 260-1, a STA E2 260-2, and a STA E3 260-3. The AP 210, the first set of relays, the second set of relays, the STA A 220, the STA C 240-3, and the set of STAs form a BSS 202.

As used herein, a STA may be implemented as an entity that incorporates a singly addressable instance of a medium access control (MAC) and physical layer (PHY) interface to the wireless medium. The STA may also include, be implemented as, or known as an access terminal (AT), a subscriber station, a subscriber unit, a mobile station, a remote station, a remote terminal, a user terminal, a user agent, a user device, user equipment, or some other terminology. In some implementations, the STA may be a cellular telephone, a cordless telephone, a Session Initiation Protocol (SIP) phone, a wireless local loop (WLL) station, a personal digital assistant (PDA), a handheld device having wireless connection capability, a wireless monitoring device, a wireless metering device, a wireless sensor, or some other suitable processing device connected to a wireless modem. Accordingly, one or more aspects described herein may be incorporated into a phone, such as a cellular phone or smartphone; a computer, such as a laptop; a portable communication device; a headset; a portable computing device, such as a personal data assistant; an entertainment device, such as a music or video device, or a satellite radio; a gaming device or system; a global positioning system device; a utility meter; a parking meter; a vending machine; a kiosk; or any other suitable device that is configured to communicate via a wireless medium.

As further described herein, an AP may be implemented as an entity that contains at least one STA and provides access to distribution services via the wireless medium. The AP may also include, be implemented as, or known as a NodeB, a radio network controller (RNC), an eNodeB, a base station controller (BSC), a base transceiver station (BTS), a base station (BS), a transceiver function (TF), a radio router, a radio transceiver, or some other terminology. In some aspects, the AP 210 may use backhaul services, for example, to communicate with a larger network, such as the Internet or a public switched telephone network (PSTN).

A variety of processes and methods may be used for transmitting signals in the wireless communications system 200, such as the transmission of signals between the AP 210 and the various devices in the BSS 202. In accordance with various aspects of the disclosed approach, wireless signals in a sub-gigahertz band may be transmitted in the wireless communications system 200 using orthogonal frequency-division multiplexing (OFDM) or Orthogonal Frequency-Division Multiple Access (OFDMA), direct-sequence spread spectrum (DSSS) techniques, a combination of OFDM and DSSS techniques, or other schemes.

For example, signals may be sent and received between the AP 210 and the various devices in the BSS 202 in accordance with OFDM/OFDMA techniques. In this case, the wireless communications system 200 may be referred to as an OFDM/OFDMA system. Alternatively, signals may be sent and received between the AP 210 and the various devices in the BSS 202 in accordance with CDMA techniques. In that case, the wireless communications system 200 may be referred to as a CDMA system. The AP 210 may act as a base station and provide wireless communication coverage in a basic service area (BSA), as further described herein. In accordance with various aspects of the disclosure, the AP 210 may use backhaul services, for example, to allow communication with a larger network, such as the Internet or a public switched telephone network (PSTN).

The AP 210 may transmit a beacon signal, or simply a "beacon", via a communication link such as the downlink 214, to the other devices of the wireless communications system 200, which may help the other devices in synchronizing their timing with the AP 210, or which may provide other information or functionality. Such beacons may be transmitted periodically. In one aspect of the disclosure, the period between successive transmissions may be referred to as a superframe. A transmission of a beacon may be divided into a number of groups or intervals. The beacon may include, but is not limited to, a peer-to-peer network identifier, a device identifier, capability information, a superframe duration, transmission direction information, reception direction information, forwarding tables, a neighbor list, and/or an extended neighbor list, some of which are described in additional detail below. In addition, the beacon may include timing information such as stamp information to set a common clock or timing regulator, which may be based on standard units of time such as seconds, minutes, hours or any sub-unit thereof. Further, the timing information may be based on an arbitrary measure, such as a counter that may start at zero when the AP 210 initializes. The AP 210 may control the timing of the system, including dividing time periods into arbitrary epochs, such that timestamps are integer values. Thus, a beacon may include information either common to or shared amongst several devices, and information specific to a given device.

In accordance with various aspects of the disclosed approach, a device may be required to join the BSS 202 in order to send communications to and/or receive communications from other devices in the BSS 202. This requirement may apply whether the device is a relay or a STA. In one aspect of the disclosed approach, the device may transmit a request to join, or associate with or attach to, the BSS 202 in the form of a message referred to as an association request message. In one aspect of the disclosure, information needed by the device for requesting the association with the BSS 202 may be included in the beacon broadcast by the AP 210. To receive such a beacon, the device may, for example, perform a broad search over a coverage region. A search may also be performed by the device by sweeping a coverage region in a lighthouse fashion, for example. After receiving the information, the device may prepare and transmit an association request message to the AP 210.

For example, the STA A 220 and the first set of relays including the relay B1 230-1 and the relay B2 230-2 may be required to associate with the AP 210 in order to send communications to and/or receive communications from the AP 210 as well as the other devices in the BSS 202. To receive the information for associating with the BSS 202 that is included in the beacon broadcast by the AP 210, the STA A 220, the relay B1 230-1, or the relay B2 230-2 may perform a broad coverage search over a coverage region. A search may also be performed by the STA A 220, the relay B1 230-1, or the relay B2 230-2 by sweeping a coverage region in a lighthouse fashion, for example. After receiving the information to be able to request association, the STA A 220, the relay B1 230-1, or the relay B2 230-2 may transmit a message such as an association request message, to the AP 210.

Figure 3:
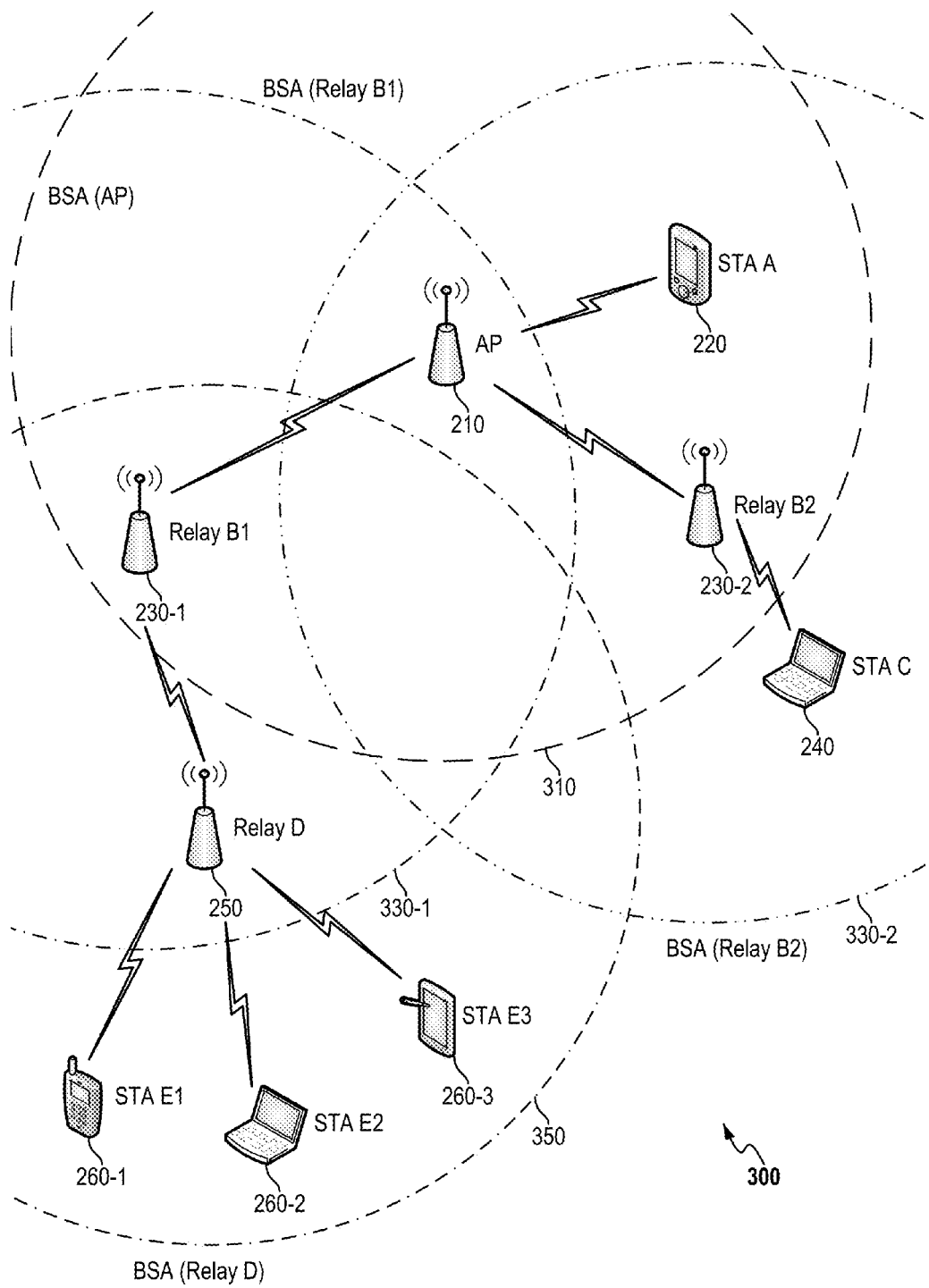
FIG. 3 is a second block diagram of the wireless communications system of FIG. 2 in which various other aspects of the disclosed approach for managing multi-hop relay networks may be understood.

Referring to a service area coverage map 300 as illustrated in FIG. 3, it may be seen that some STAs in the BSS 202 may be located within the BSA 310 of the AP 210 while other STAs may be located outside of the BSA 310. For example, the STA A 220 may be located within the BSA 310. As such, the STA A 220 may associate with the AP 210 and perform wireless communications directly with the AP 210. Other STAs, for example, the STA C 240, the STA E1 260-1, the STA E2 260-2, and the STA E3 260-3 may be outside of the BSA 310 of the AP 210. Other devices such as the first set of relays including the relay B1 330-1 and the relay B2 330-2 may be inside the BSA 310 of the AP 210. As such, the relay B1 330-1 and the relay B2 330-2 may be able to associate with the AP 210 and perform wireless communications directly with the AP 210. It should be noted that the wireless communications system 100 may not have a central AP such as the AP 210, but rather may function as a peer-to-peer network without the AP 210. Accordingly, the functions of the AP 210 described herein may alternatively be performed by one or more of the other devices.

Similar to the AP 210, each relay in the first set of relays and the second set of relays may act as a base station and provide wireless communication coverage in a BSA. For example, the first set of relays includes the relay B1 230-1, which may act as a base station and provide wireless communications coverage in a BSA 330-1. The first set of relays also includes the relay B2 230-2, which also may act as a base station and provide wireless communications coverage in a BSA 330-2. In addition, each relay in the second set of relays, including the relay D 250, may also act as a base station and provide wireless communications coverage in a BSA 350. Thus, when a device is outside of the BSA of the AP, one or more relays may be used to forward communications from the device to the AP provided that the device is in a coverage area as provided by the BSA of at least one relay. For example, where the STA C 240 is outside of the BSA 310 of the AP 210 but within the BSA 330-2 of the relay B2 230-2, the relay B2 230-2 may be used to provide relay services to facilitate communication between the STA C 240 and the AP 210. As another example, where the relay D 250 is also outside of the BSA 310 of the AP 210 but inside the BSA 330-1 of the relay B1 230-1, the relay D 250 may use the relay B1 230-1 to provide relay services for facilitating communications between the relay D 250 and the AP 210. In addition, the relay B1 230-1 may also facilitate communications from the set of STAs associated with the relay D 250 to the AP 210 as the set of STAs including the STA E1 260-1, the STA E2 260-2, and the STA E3 260-3 are located within the BSA 350 of the relay D 250.

In one aspect of the disclosure, after a relay has formed an association with either an AP or another relay that has already formed an association with the AP, the relay may provide a beacon signal similar to the one broadcast by the AP. For example, the beacon signal may include the same service set identifier (SSID) as that used by the AP with which the relay has formed an association. Through this beacon, a device that is outside of the BSA of the AP may still request an association with the BSS using information in the beacon signal similar to the fashion in which the device would request association with the AP when that device is in the BSA of the AP, as discussed above. Because the relay is broadcasting the beacon signal in a fashion similar to the AP, the device is not aware of the fact that it is not communicating with the AP. This promotes transparency in that legacy devices do not need to be aware of the addition of relays into the architecture. Once the device is associated with the BSS, it may then send and receive data with the AP through its link with the relay. The relay may forward data received from the device to the AP, either directly or indirectly through one or more intermediary relays that are associated with the AP. Similarly, when the relay receives data from the AP, either directly or through one or more intermediary relays, the relay may forward the data to the device. By providing relay services between the device and the AP, the relay effectively allows the device to communicate with the AP despite the device being unable to directly communicate with the AP.

Continuing with the example illustrated in FIG. 2, the relay B1 230-1 may broadcast a beacon to allow the relay D 250 to send an association request message to the relay B1 230-1 to request association with the AP 210. Similarly, the relay B2 230-2 may broadcast a beacon to allow the STA C 240 to send an association request message to the relay B2 230-2 to request an association with the AP 210. Once the relay D 250 has formed an association with the AP 210, it may transmit a beacon to allow the set of STAs including the STA E1 260-1, the STA E2 260-2, and the STA E3 260-3 to request association with the AP 210. Thus, to communicate with the relay D 250, the STA E1 260-1, the STA E2 260-2, and the STA E3 260-3 may associate with the relay D 250 in a similar manner as the STA C 240 associated with the relay B2 230-2 as described above. Therefore, the wireless communications system 200 provides a multi-hop topology of relays extending out from AP 210 to provide wireless communications services beyond the BSA 310 of AP 210. As such any of the STAs may communicate within the BSS 202 of the AP 210 in the wireless communications system 200 at any level of the multi-hop topology. For example, as shown, STAs may communicate directly with the AP 210, as shown by the STA A 220. STAs may also communicate with the AP 210 through one hop of relays, for example, as shown by the STA C 240, which may communicate the AP 210 through the relay B2 230-2. STAs may also communicate with the AP 210 through two hop of relays, as shown by the STA E1 260-1, the STA E2 260-2 communicating with the AP 210 through relay services provided by the relay D 250, which itself communicates with the relay B1 230-1 to send data upstream to the AP 210.

Figure 4:
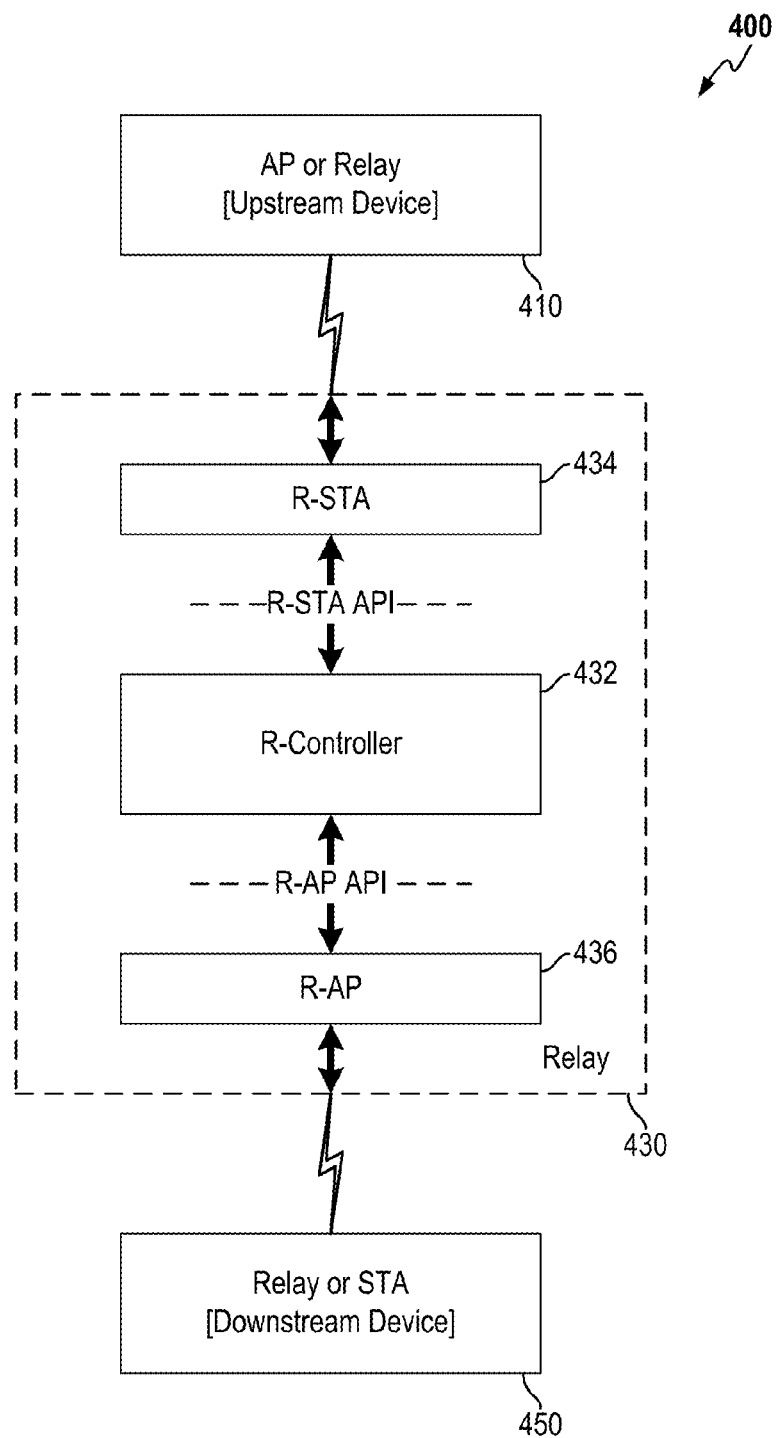
FIG. 4 is a block diagram of a simplified version of a wireless communications system that may be used to describe various aspects of a relay that may be configured in accordance with the disclosed approach for managing multi-hop relay networks.

FIG. 4 illustrates a wireless communications system 400 that may be used to further describe a relay configured in accordance with various aspects of the disclosed approach for managing a multi-hop relay network, where a relay 430 may include two generic STAs. One of the generic STAs is configured to operate in a STA mode and is referred to as an R-STA, as shown by an R-STA 434 in the relay 430. The other one of the generic STAs is configured to operate in an AP mode and is referred to as an R-AP, as shown by an R-AP 436 in the relay 430. A further described herein, the R-STA 434 and the R-AP 436 are configured to interface with an AP such as the AP 410, and a STA such as the STA 440, respectively. It should be noted that the description contained herein for operation of should also apply if, instead of the AP 410, a relay instead is upstream from the relay 430. In this case, the relay would operate in a fashion similar to the relay 430 in that it would forward any notifications received from the relay 430 to its upstream device, whether that device is an AP or another relay, whereas the AP by definition does not transmit anything upstream as there is no devices upstream to it. It should also be noted that the description contained herein for operation of the relay 430 should also apply if, instead of the STA 450, a relay instead is downstream from the relay 430. In this case, the relay 430 would receive the update as if the relay was reporting to an AP and the relay would not be aware that the relay 430 is not an AP. The R-STA 434 and the R-AP 436 may be controlled by an R-Controller 432 for providing various multi-hop relay network management functionality, as further described herein.

In accordance with various aspects of the disclosed approach, the two generic STAs of the R-STA 434 and the R-AP 436 of the relay 430 may be configured with support for the following MAC framing capabilities:

inserting a Relay_Reachable_Address information element (IE) in an Association Request frame; and generating Relay Reachable Address Action frame;

where the Relay_Reachable_Address IE refers to an information element that may contain particular parameters, as further described herein. The framing capability as well as the various functions provided by the relay 430 as detailed herein support multi-hop network management functionality in accordance with various aspects of the disclosed approach.

FIG. 5 illustrates an exemplary format of a Relay_Reachable_Address IE 500 that includes an Addresses field for carrying a list of addresses that are reachable through the Relay. In one aspect of the disclosure, MACID addresses may be used in the list of addresses. Other IDs may be used. The Relay_Reachable_Address IE 500 is used by the Forwarding Table Management procedure. A relay transmits the Relay_Reachable_Address IE 500 in the Association Request frame. A receiving upstream relay or AP may use the information in the Relay_Reachable_Address IE 500 to decide whether it will allow a Relay-Link to be established. For example, if the receiving upstream relay or AP cannot serve any more addresses, such as if its forwarding table is full, then the receiving upstream relay or AP may not allow an association to be made. However, if the receiving upstream relay or AP decides to allow the Relay-Link to be established, then it may use the information in the Relay_Reachable_Address IE 500 to update its forwarding table.

FIG. 6 illustrates an exemplary format of a Relay Reachable Address action frame 600 that includes an Addresses field that carries a list of addresses that are reachable through the relay. In one aspect of the disclosure, MACID addresses may be used in the list of addresses. Other IDs may be used. The Relay Reachable Address action frame 600 may be used by the R-Controller 432 as part of implementing forwarding table management. For example, the relay 430 may transmits the Relay Reachable Address action frame 600 to its upstream Relay or AP when there is a change in the forwarding table of the relay 430. The receiving upstream relay or AP may then use information contained in the Relay Reachable Address action frame 600 to keep its forwarding table updated.

In accordance with one aspect of the disclosed approach, the R-STA 434 is configured to operate as a special version of a STA in that it may include all the functionality of a STA. Thus, for example, the relay 430 may communicate with the AP 410 in the same manner as a STA such as the STA 440 would communicate with the AP 410. In accordance with various aspects of the disclosure, the R-STA 434 may associate with the AP 410 in order to send communications to and/or receive communications from the AP 410; through which the relay 430 will need to support any STAs that associate with it to communicate with the AP 410. In one aspect of the disclosure, information for associating with the AP 410 may be included in a beacon signal broadcast by the AP 410. To receive such a beacon, the R-STA 434 may, for example, perform a broad coverage search over a coverage region. A search may also be performed by the R-STA 434 by sweeping a coverage region in a lighthouse fashion, for example. After receiving the information needed to request association, the R-STA 434 may transmit a message, such as an association probe or request frame, to the AP 410. In one aspect of the disclosed approach, the R-STA 434 may utilize a particular station address assigned to the R-STA 434 when exchanging network messages with the AP 410.

As a complement to the functionality provided by the R-STA 434, the R-AP 436 is configured to operate as a special version of an AP, whereby the R-AP 436 provides all the functions of an AP such as the AP 410. As such, the relay 430 may appear to be an AP to STAs such as the AP 410 would appear to the STA 450. Thus, the STA 450 may associate with the relay 430 as if the relay 430 is an AP. In accordance with various aspects of the disclosed approach, the STA 450 may associate with the relay 430 in order to send communications to and/or receive communications from the relay 430, through which the STA 450 may communicate with the AP 410. In one aspect of the disclosure, information needed for the STA 450 to request association is included in a beacon broadcast by the R-AP 436. After receiving the beacon, the STA 450 may transmit a message, such as an association probe or request frame, to the R-AP 436. In one embodiment, the R-AP 436 may utilize another station address that is assigned to the R-AP 436 that is different than the station address used when exchanging network messages with one or more stations.

Because the relay 430 may function as a STA to upstream devices such as the AP 410 through the use of the R-STA 434 while also functioning as an AP to downstream devices such as the STA 450 through the use of the R-AP 436, the relay 430 may provide relay services between the AP 410 and the STA 450, or any other STA that may need to use the relay 430 to communicate with the AP 410. For example, the AP 410 and the STA 450 may be outside of each other's respective transmission range. However, the AP 410 and the STA 450 may both be able to communicate with the relay 430 because the relay 430 is within the transmission ranges of both the AP 410 and the STA 450. In that case, the relay 430 may be able to provide relay services for the communication between the AP 410 and the STA 450. Note that while only one relay such as the relay 430 and only one STA such as the STA 450 are illustrated; the wireless communications system 400 may comprise any number of relays and STAs. Multiple relays may be necessary to provide sufficient coverage for the BSS controlled by the AP 410.

Referring still to FIG. 4, the relay 430 also includes the R-Controller 432. In accordance with various aspects of the disclosed approach, the R-Controller 432 controls operation of the R-STA 434 and the R-AP 436 to provide functionality in accordance with various aspects of the disclosed approach for implementing multi-hop relay networks. In one aspect of the disclosed approach, the R-Controller 432 provides topology management for the BSS with which it is associated by maintaining information about upstream devices so that it may determine, for example, if a new connection needs to be made, such as an association with another relay or the AP 410, because the other upstream device may provide better communication rates. If so, then the R-Controller 432 may interface with the R-STA 434 to do so. In one aspect of the disclosure, the R-STA 434 may provide the following functionality, in addition to the STA functionality it provides, for use by the R-STA 434:

1. Topology Tracking: This procedure tracks relays in the vicinity by processing Beacon and Probe Response frames. It maintains a list of relays that meet the minimum signal quality requirement. It periodically reports the list of relays and their hops value.

2. Upstream Relay Link Monitoring: This procedure keeps track of the Relay-Link to the upstream relay.

In another aspect of the disclosure, the R-Controller 432 may also provide forwarding table management functionality, where the R-Controller 432 may create, store, and update a forwarding table with information about devices that reachable through the relay 430 by interfacing with the R-AP 436 where, in one aspect of the disclosure, the R-AP 436 may provide the following functions for control by the R-Controller 432:

1. Topology Broadcast: This procedure adds the Relay Topology IE to the Beacon and Probe Response frames.

2. Downstream Relay Link Monitoring: This procedure keeps track of Relay-Links to downstream Relays.

Communication between the R-Controller 432 and either the R-STA 434 and the R-AP 436 may take place through a passing of primitives using an application programming interface (API), such as the R-STA API and R-AP API, respectively. In accordance with various aspects of the disclosed approach, each primitive may either specify an action to be performed such as, for example, such as one of the procedures described above for the R-STA 434 or the R-AP 436; or report a result of a previously requested action. A primitive may also carry the parameters needed to perform its functions. In accordance with one aspect of the disclosed approach, two types of primitives are used:

1. Request: A primitive sent by the R-Controller 432 to the R-STA 434/the R-AP 436 to activate a service or an action; and
2. Indication: A primitive returned to the R-Controller 432 by the R-STA 434/the R-AP 436 to notify the activation of a service or of an action.

Figure 7:
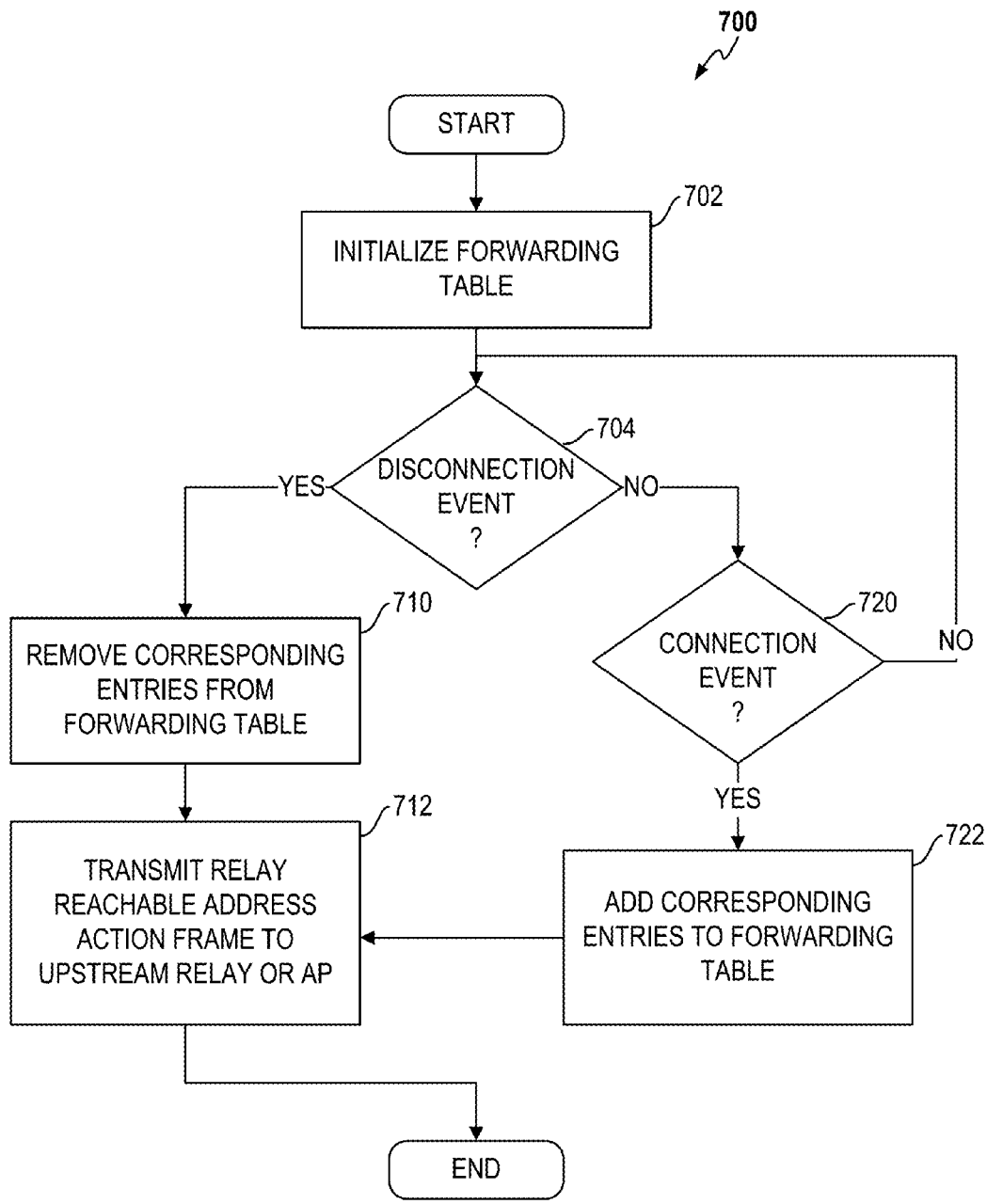
FIG. 7 is a flow diagram illustrating a forwarding table management process that may be implemented on a relay configured in accordance with one aspect of the disclosed approach for multi-hop relay network management.
Figure 8:
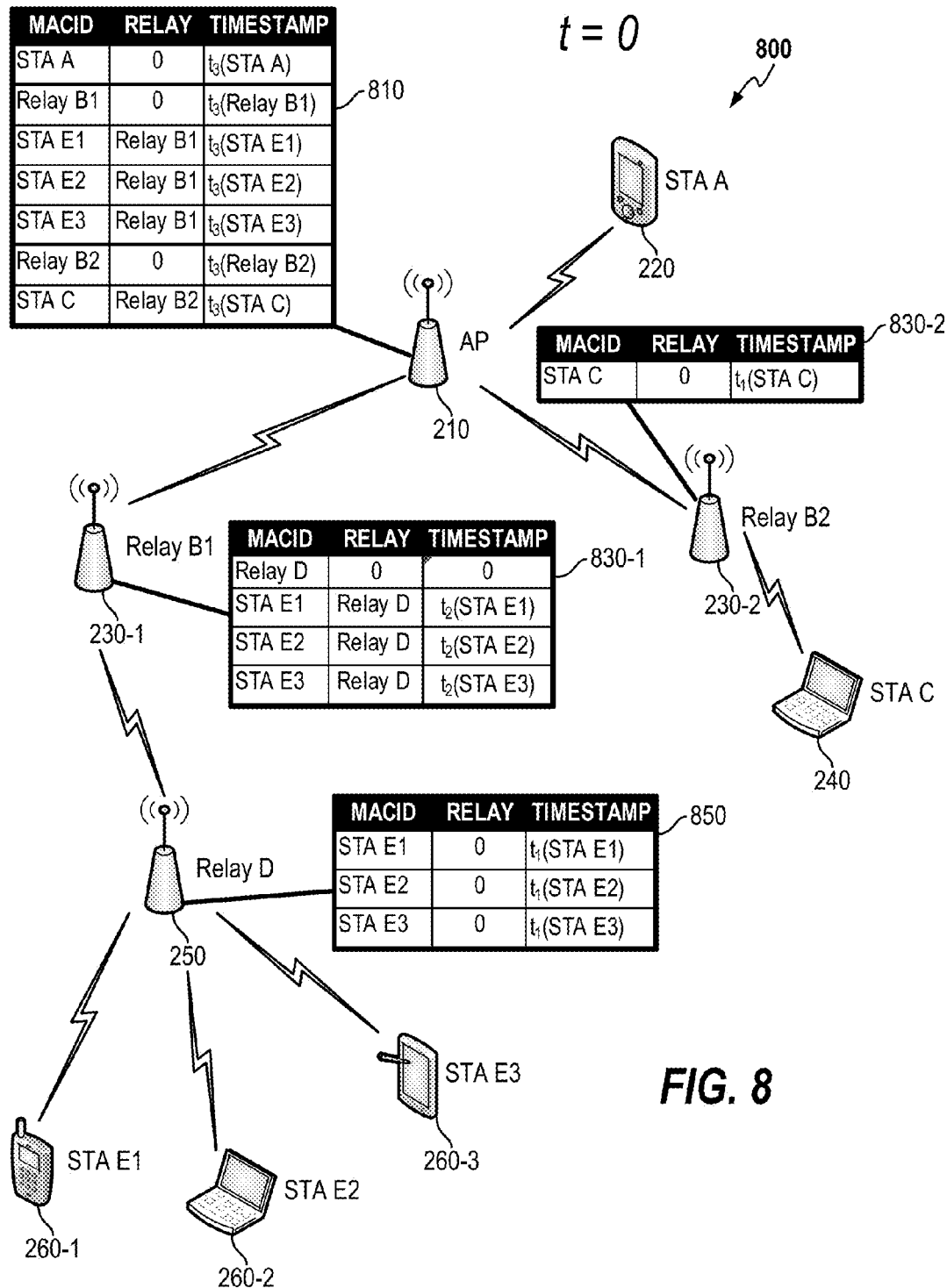
FIG. 8 is a diagram of various forwarding tables used in the wireless communication system of FIG. 2 at an initial time that may be used to illustrate the forwarding table management process of FIG. 7.
Figure 11:
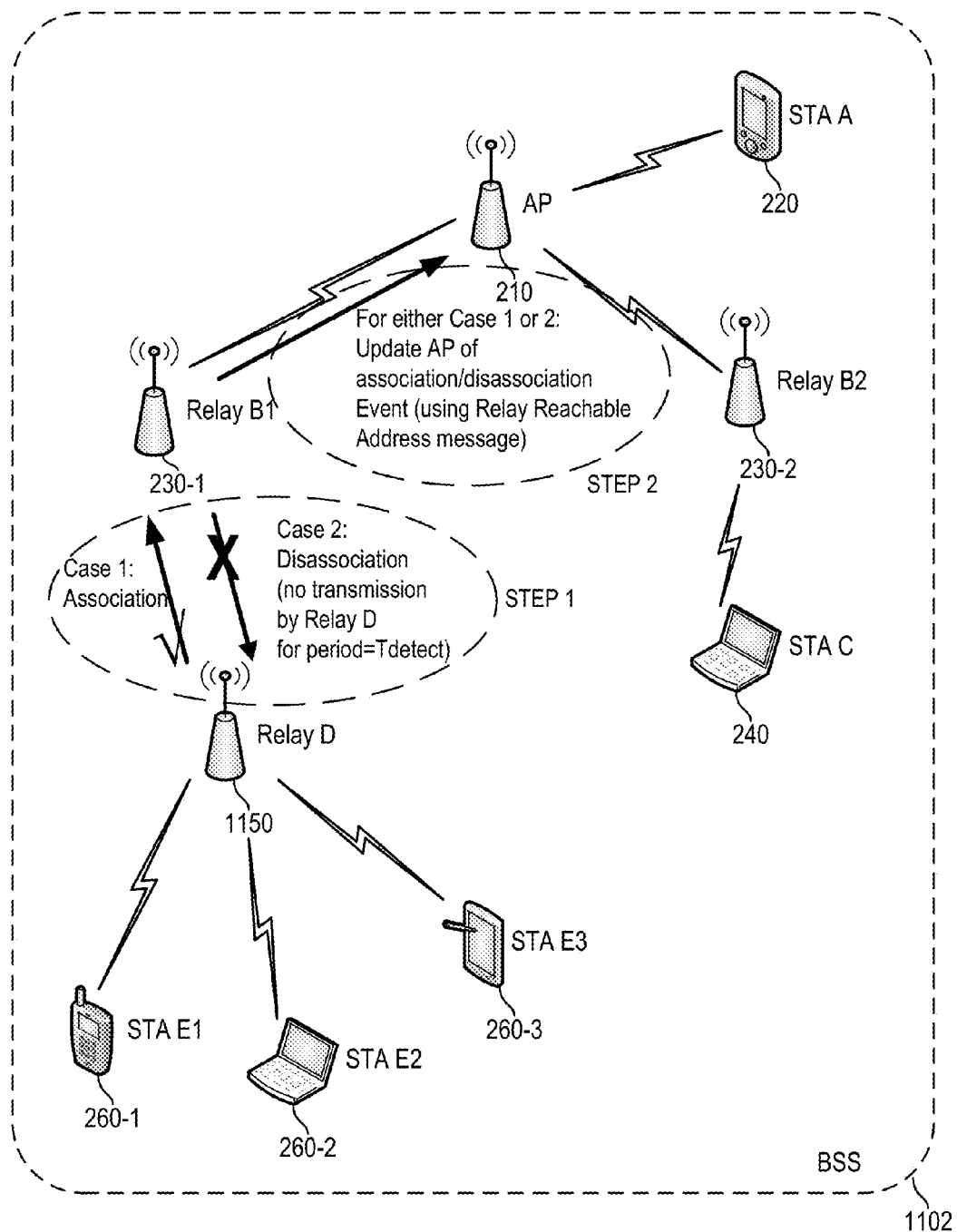
FIG. 11 is a diagram summarizing an update process in the wireless communication system of FIG. 2 that may be used to illustrate the forwarding table management process of FIG. 7 for forwarding table update notifications.

Various aspects of the multi-hop relay network management approach may be better understood with reference to FIG. 7, which illustrates a forwarding table management process 700 that may be implemented in an R-Controller such as the R-Controller 432 of a relay such as the relay B1 230-1. Reference will also be made to FIG. 8 where, as a specific example, a forwarding table as stored in each of the first set of relays, including a forwarding table 810 in the relay B1 230-1 and a forwarding table 830-2 in the relay B2 230-2; the second set of relays, including a forwarding table 850 in the relay D 250; and a forwarding table 810 in the AP 210 of the wireless communications system 200 is shown. Reference will also be made to FIG. 11, where a summary of the scenarios appropriate for FIG. 7 are illustrated. In accordance with one aspect of the disclosed approach, each forwarding table includes a row having a MACID field, a RELAY field, and a TIMESTAMP field for each address reachable through the associated relay or AP.

The MACID field includes addresses that are reachable through the relay such that MACID field may be populated by:
1. MACIDs reported as reachable by a downstream relay;
2. MACIDs of STAs directly associated with the R-AP component of the relay; and,
3. MACIDs of R-STA component of a relay with a Relay-Link to the relay, where it should be noted that in an attempt to avoid complicating the disclosure, real MACIDs are not shown in the forwarding tables of FIG. 8. Instead, a more readable name of the device with which the MACID corresponds is used. Referring to the forwarding table 830-1 as stored in the relay B1 230-1, it may be seen that the MACID of the relay D 250 is stored along with the MACIDs of STA E1 260-1, STA E2 260-2, and STA E3 260-3 as these addresses are reachable through the relay D 250.

The RELAY field may store the MACID address of the R-STA component of the downstream relay through which the MACID address in the MACID field of each row of the forwarding table is reachable. In the example of the forwarding table 830-1 in FIG. 8, the value of the RELAY field is 0 for the relay D 250 as the relay D 250 is directly reachable and the MACID of the relay D 250 may already be found in the first row of the forwarding table 830-1. Further, the values of the RELAY fields for the STA E1 260-1, STA E2 260-2, and STA E3 260-3 are all equal to the MACID address of the relay D 250 as these are reachable through that address.

The TIMESTAMP field may store when information in the MACID field and the RELAY field in a corresponding row is last updated. In one aspect of the disclosed approach, a relay may update a timestamp field when it detects a change in an attachment state of a relay or a STA in its forwarding table.

Turning to FIG. 7, at 702 a row in the forwarding table for the R-AP of the relay may be added during initialization of the relay. This allows reporting of the MACID of the relay along with any addresses reachable through the relay. To reduce the complexity of the figure, this row will not be illustrated in the various forwarding tables. After initialization, the relay may update the forwarding table according to a detection of various events.

At 704, the relay may determine if a disconnection event has been detected. The disconnection event may include receiving a Disconnect-Indication signal from the R-AP 436, such as where a STA has become disconnected from the relay. The disconnection event may also include receiving a Downstream-Relay-Link-Lost-Indication signal from the R-AP 436, where the relay has determined there has been a loss of association with a downstream relay. In one aspect of the disclosed approach, in the example illustrated for FIG. 7, the relay may determine if a frame has been received from each address in the forwarding table within a predetermined period of time, referred to as $T_{Detect}$. If a STA or a relay does not transmit a frame for a period of time longer than $T_{Detect}$, then it may automatically become disassociated by the relay without notice. In another aspect of the disclosed approach, a STA or a relay may not be allowed to re-associate with the BSS within a period shorter than the length of $T_{Detect}$. In yet other aspects of the disclosed approach, the length of time that a STA or a relay is not allowed to re-associate with the BSS may be chosen so long as it is of sufficient length to avoid a race condition.

Figure 9:
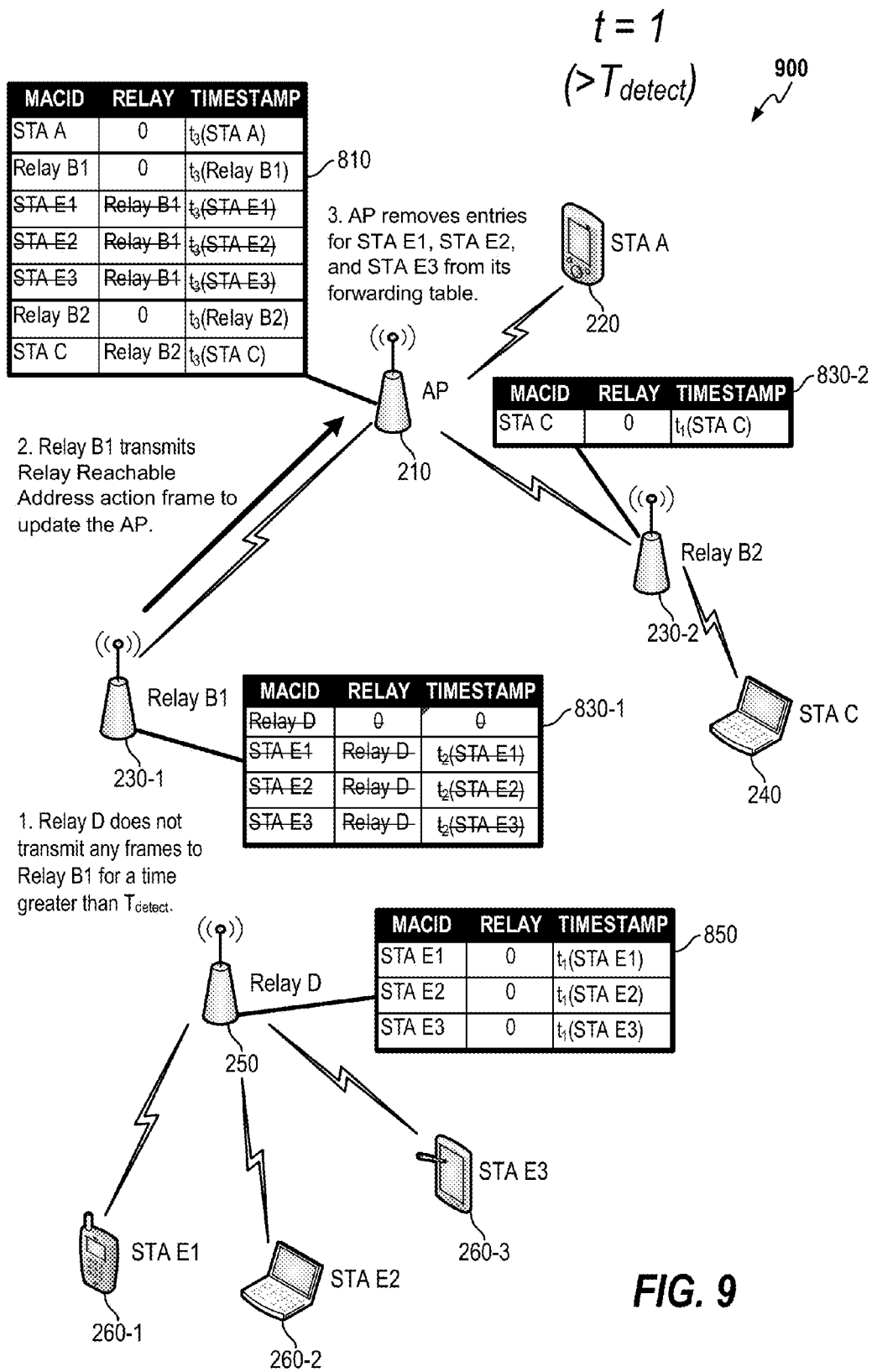
FIG. 9 is a diagram of the various forwarding tables of FIG. 8 at a first time that may be used to illustrate the forwarding table management process of FIG. 7 where a downstream relay has been disassociated from the relay.

If a disconnection event has been received, then operation continues with 710, where one or more rows may be removed in the forwarding table of the relay. For example, when a directly connected STA has become disassociated from the relay and detached from the BSS, the row corresponding to the STA may be removed. Where a downstream relay has become disassociated from the relay and detached from the BSS, the rows associated with the downstream relay and the addresses reachable through the downstream relay may be removed. Referring to FIG. 9, where the relay D 250 has become disassociated from the relay B1 230-1 and detached from BSS 202, the relay B1 230-1 may remove the entries in the forwarding table 830-1 for the relay D 250 as well as the STA E1 260-1, the STA E2 260-2, and the STA E3 260-3, which are the addresses previously reachable through the relay D 250. Once the forwarding table has been updated to remove the rows corresponding to the detached addresses, operation continues with 712.

At 712, the relay may propagate changes to its forwarding table by transmitting a Relay Reachable Address action frame to an upstream relay or AP. In one aspect of the disclosed approach, the relay may send the forwarding table with the list of addresses reachable through the relay in the Relay Reachable Address action frame. In another aspect of the disclosure, only the MACID address and the BSS-Attach-Time for each of the changed entries as determined by the relay may be transmitted in the Relay Reachable Address action frame. Referring again to FIG. 9, the relay B1 230-1 may transmit a Relay Reachable Address action frame to the AP 210 to allow the AP 210 to update its forwarding table 810.

At 720, the relay may determine if a connection event has been received from the R-AP 436. The connection event may include receiving a Connect-Indication signal, such as where a STA desires to directly connect to the relay. The connection event may also include a Downstream-Relay-Link-Established-Indication signal, where the relay has established an association with a downstream relay. Continuing with the example shown in FIG. 9 where the relay D 250 has previously become disassociated from the relay B1 230-1 and detached from BSS 202, reference is now made to FIG. 10, where the relay D 250 now appears near the relay B2 230-2 and requests association with the relay B2 230-2 by sending an association request frame that includes a Relay_Reachable_Address IE to the relay B2 230-2.

If a connection event has been detected by the relay, then operation continues with 722, where one or more rows may be added in the forwarding table of the relay. For example, a row may be added for a directly connected STA, and one or more rows may be added for an association of a downstream relay along with a list of the addresses reachable through that downstream relay. For example, in FIG. 10, a relay such as the relay B2 230-2 may add entries in the forwarding table 830-2 for the relay D 250 as well as the STA E1 260-1, the STA E2 260-2, and the STA E3 260-3, which are the addresses reachable through the relay D 250. Once its forwarding table has been updated to add the rows corresponding to the detached addresses, operation continues with 712.

Figure 10:
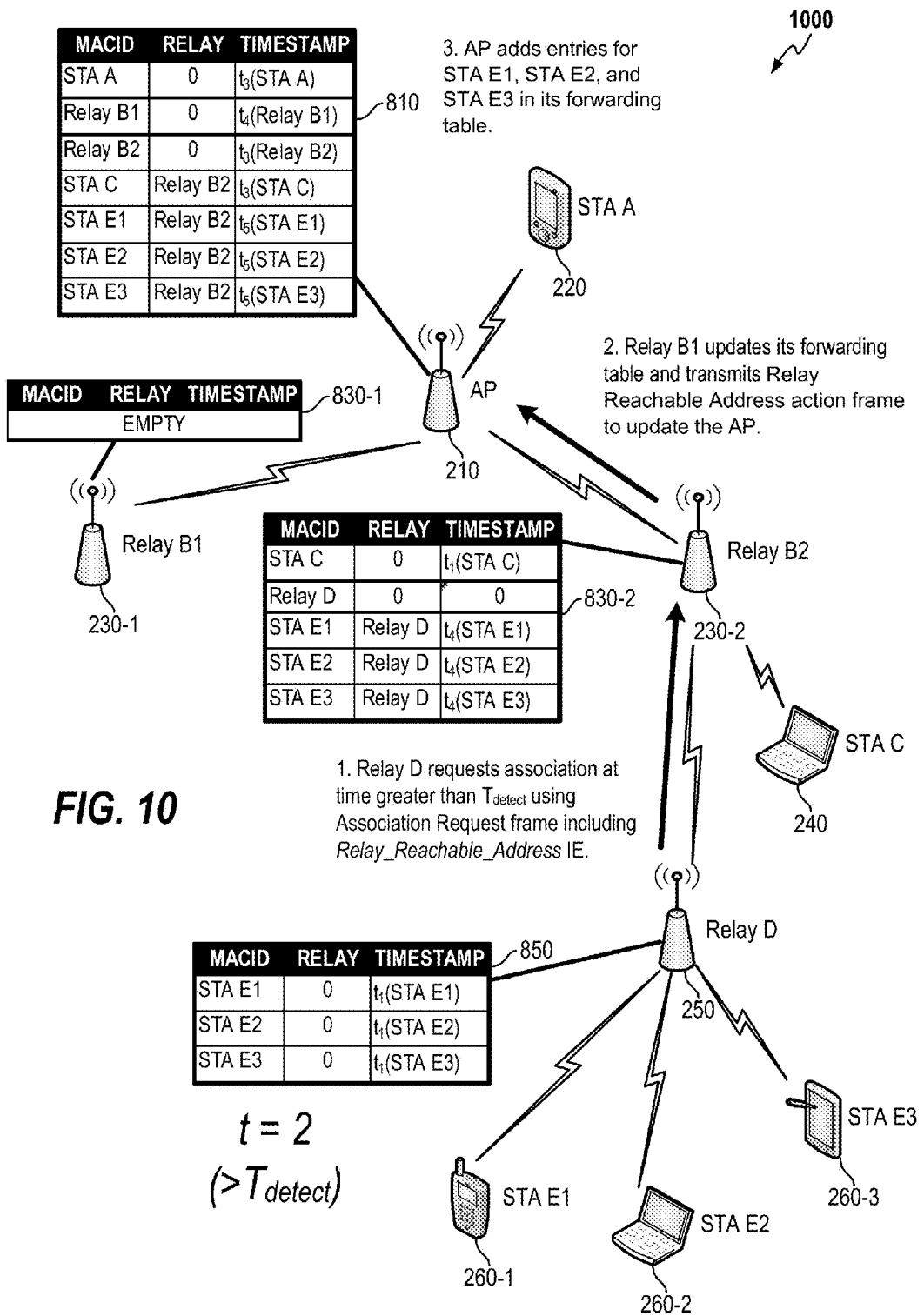
FIG. 10 is a diagram of the various forwarding tables of FIG. 8 at a second time that may be used to illustrate the forwarding table management process of FIG. 7 where a downstream relay has been associated with the relay.

At 712, compared to the example shown in FIG. 9 of the relay D 250 becoming disassociated with the relay B1 230-1 and becoming detached from the BSS, FIG. 10 illustrates the example where when a relay such as the relay B2 230-2 detects a connection request from the relay D 250, the relay may propagate changes to its forwarding table by transmitting a Relay Reachable Address action frame to an upstream relay or AP such as the AP 210 to allow the AP to update its forwarding table, such as forwarding table 810. In one aspect of the disclosed approach, the relay may send the forwarding table with the list of addresses reachable through the relay and the BSS-Attach-Time in the Relay Reachable Address action frame. In another aspect of the disclosure, only the MACID address and the BSS-Attach-Time for each of the changed entries as determined by the relay may be transmitted in the Relay Reachable Address action frame.

In addition to a relay detecting an attachment- or a detachment-related event necessitating a forwarding table change at the relay, the relay may also need to change its forwarding table when it detects a receipt of an Reachable Address-Report-Indication from the R-AP 436, which may be due to a downstream relay reporting changes to its forwarding tables. Regardless of the specific method of detection of the need for a change to the forwarding table, as long as the latest BSS-Attach-Time is used to determine the most recent entry when a conflict is seen by an upstream node, almost all issues related to the updating of the forwarding table may be eliminated.

In a multi-tiered topology configured in accordance with various aspects of the disclosed approach, each relay is capable of connecting to another relay in addition to directly connecting to an AP. If a relay that is actively serving multiple STAs is to find another upstream relay, it may break connection with the current relay link and establish connection with the other upstream relay. Similarly, a STA may break connection with its currently serving upstream device and establish connection with another upstream device. Neither the relay nor the STA need to inform its currently upstream serving device of its desire for the disassociation before it occurs. Because a multi-hop relay network configured in accordance with various aspects of the disclosed approach should be flexible enough to accommodate these events, any potential conflicts from update messages when race conditions occur from a relay or the AP receiving multiple update messages with conflicting information. The mechanisms for managing multi-hop relay networks may prevent any issues with updating of forwarding tables during these events.

Figure 12:
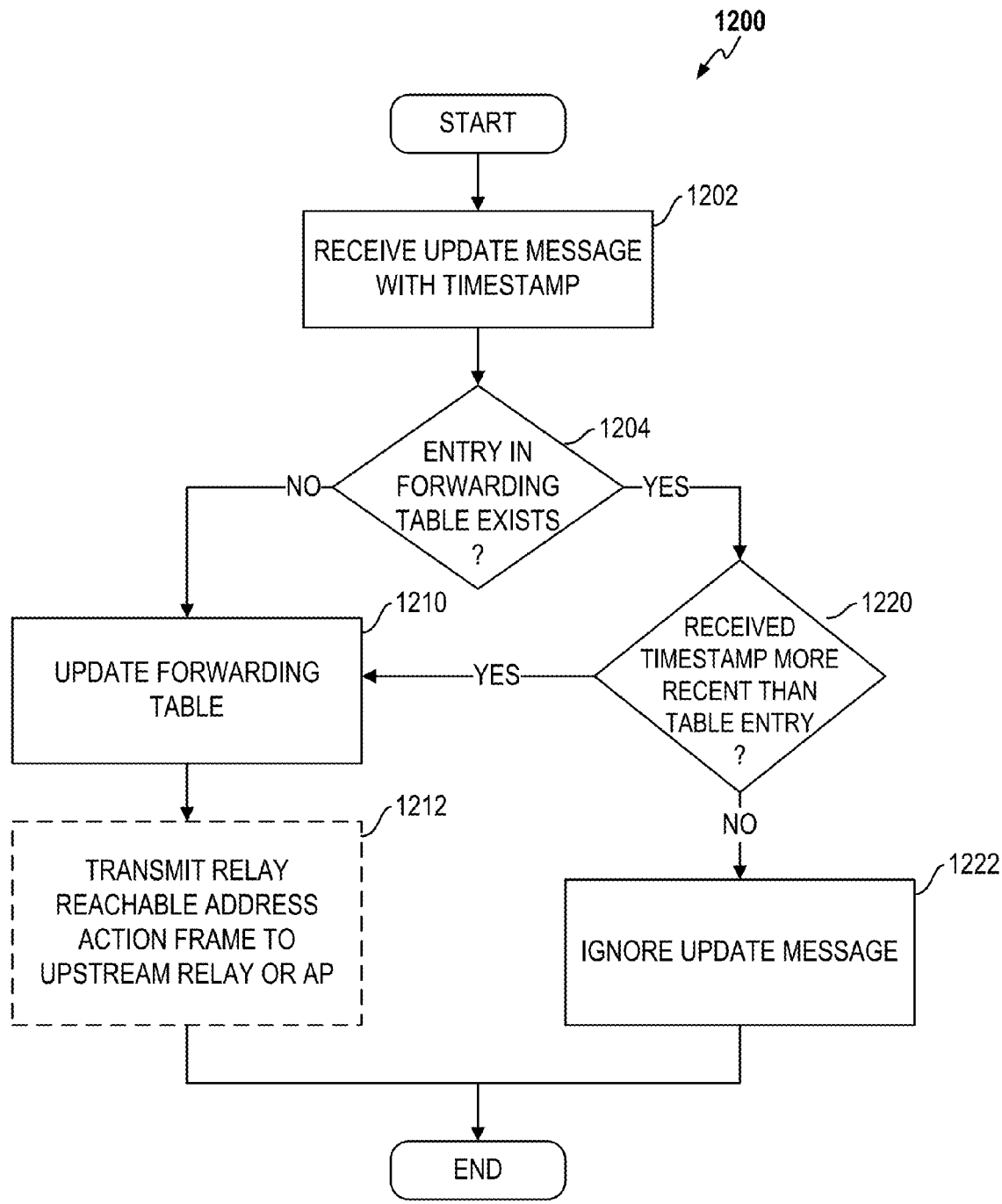
FIG. 12 is a flow diagram illustrating another forwarding table management process that may be implemented on a relay or an access point configured in accordance with one aspect of the disclosed approach for multi-hop relay network management for resolution of conflicting forwarding table update notifications.

FIG. 12 is a flow diagram illustrating another forwarding table management process 1200 that may be implemented on an AP or a relay configured in accordance with one aspect of the disclosed approach for multi-hop relay network management for resolution of conflicting forwarding table update notifications. The forwarding table management process 1200 may be better understood with reference to FIG. 13, where a scenario 1300 illustrating a transition of the relay D 250 from the relay B1 230-1 to the relay B2 230-2 involves a disassociation of the relay D 250 from the BSS 202 at step 1 before the relay D 250 re-associates with the BSS 202 at step 2, which is at a later time.

The disassociation may be due to the relay D 250 not having sent messages within a period of $T_{Detect}$ to the relay B1 230-1. Because the relay D 250 does not have to specifically notify an upstream device such as the relay B1 230-1 of a decision to disconnect from the BSS 202, the relay D 250 may simply decide to leave the BSS 202 without informing the relay B1 230-1. To ensure that stale records are not kept in its forwarding table and also disassociations are timely reported, the relay B1 230-1 may check to see if any communication is received from each device in its forwarding table within the period of $T_{Detect}$. If not, the relay B1 230-1 may send a forwarding table notification to its upstream device to inform the upstream device of a disassociation event. For example, the AP 210 may receive a forwarding table update notification from the relay B1 230-1 when the relay B1 230-1 detects a change of a state of association of a device such as a disassociation of the relay D 250 for not having received a message from the relay D 250 within the period of $T_{Detect}$.

Consider the scenario where the relay D 250 transmits an association request to relay B2 230-2 with a Relay Reachable Address IE in the Association Request at step 2. In one aspect of the disclose approach, the association request may be sent after a period of no shorter than $T_{Detect}$, as discussed herein.

At steps 3, the relay B1 230-1 and 3', the relay B2 230-2 may end up sending conflicting notifications, where at step 3: the relay B1 230-1 sends an update message to the AP 210 (or upstream device) that the relay D 250 has disassociated. However, at step 3', the relay B2 230-2 also sends an update message to the AP 210 that the relay D 250 has associated with the BSS 202. Assume that the association update message from the relay B2 230-2 reaches the AP 210 first, then the forwarding table at the AP 210 will first be correctly updated to show that the relay D 250 may be reached at the relay B2 230-2. However, when the disassociation update message from the relay B1 230-1 reaches the AP 210, then the forwarding table at the AP 210 will be incorrectly updated to show that the relay D 250 is completely disassociated with the BSS 202.

In one aspect of the disclosed approach, at step 4, the AP 210 may provide a resolution of the update messages conflict by use of the forwarding table management process 1200, where the AP 210 may resolve conflicting notifications from receiving notification messages at 1202 by only storing information from a notification update message with most the recent timestamp. Thus, continuing from the example above, the AP 210 would keep only the information from the notification message from the relay B2 230-2, as seen at 1220 and 1222, where the timestamp for the relay D 250 in the notification message from the relay B1 230-1 is compared to an existing timestamp, which in this case is the timestamp for the relay D 250 in the notification message previously received from the relay B2 230-2 and stored in the forwarding table. It should be noted that the conflict resolution is performed for each device that is identified in the notification message as each device may have a separate timestamp based on its attachment time with the BSS 202. Thus, the notification messages from the relay B1 230-1 and the relay B2 230-2 each contains entries for the STA E1 260-1, the STA E2 260-2, and the STA E3 260-3.

If it is determined there are no entries in the forwarding table at 1204 for the devices in the notification message, then the AP 210 will update the forwarding table at 1210 to add entries as appropriate. The AP 210 may also update its forwarding table for a particular device at 1210 if the received notification message includes a timestamp for that device that is more recent than the previously received timestamp for that device that is stored in the forwarding table. For example, if the timestamp for the relay D 250 in the notification message from the relay B1 230-1 is more recent than the existing timestamp for the relay D 250 stored in the forwarding table (which was obtained from the notification message previously received from the relay B2 230-2), then the AP 210 may update the existing timestamp in the forwarding table.

At 1212, if the forwarding table management process 1200 is being executed on a relay instead of an AP, then the relay may transmit a notification message as a relay reachable address action frame to upstream devices, which may be relays or an AP.

Advantageously, certain aspects of the devices described herein as configured in accordance with various aspects of the disclosed approach for managing multi-hop relay networks may consume less power than devices implementing other wireless protocols. These devices may also be used to support transmissions of data using wireless signals across a wireless network spanning a relatively long distance, for example about one kilometer or longer. In one aspect of the disclosed approach, the wireless network may be used for communicating data for sensors, metering, and smart grid networks. However, these examples, as well as the other examples provided herein should be understood to be non-limiting as they are but a few situations for which the disclosure may be useful.

A wireless device such as any one of the wireless devices described herein may communicate via one or more wireless communications links that are based on or otherwise support any suitable wireless communications technology. The wireless device may thus include either an AT and/or an AP, as broadly defined herein. For example, in some aspects of the disclosed approach, a wireless device may associate with a network. In some aspects the network may comprise a local area network or a wide area network. A wireless device may support or otherwise use one or more of a variety of wireless communications technologies, protocols, or standards such as, for example, CDMA, TDMA, OFDM, OFDMA, WiMAX, and Wi-Fi. Similarly, a wireless device may support or otherwise use one or more of a variety of corresponding modulation or multiplexing schemes. A wireless device may thus include appropriate components such as air interfaces to establish and communicate via one or more wireless communications links using the above or other wireless communications technologies. For example, a device may comprise a wireless transceiver with associated transmitter and receiver components that may include various components that facilitate communications over a wireless medium, examples of which may include signal generators and signal processors.

Figure 14:
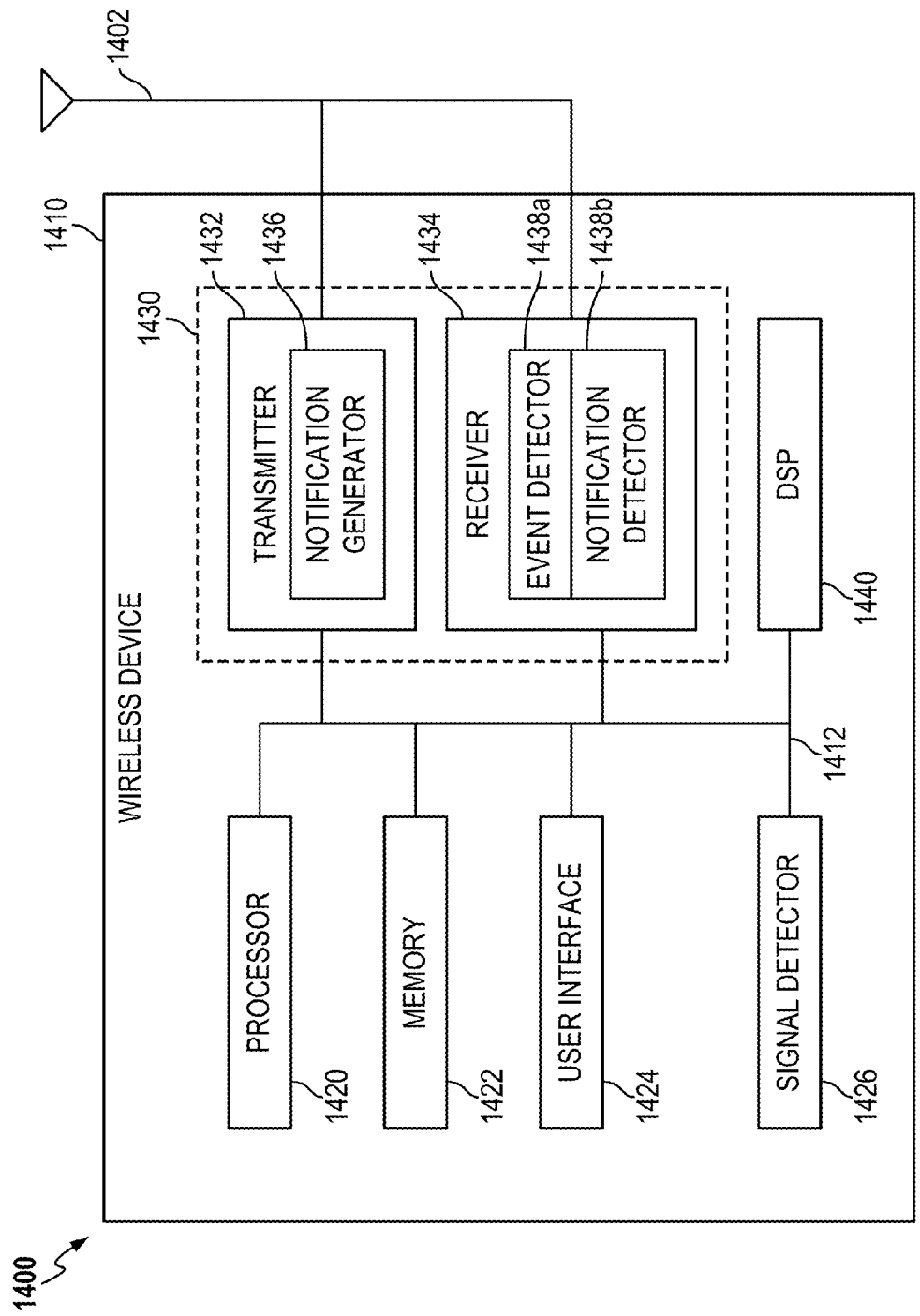
FIG. 14 is a block diagram of a wireless communications device configured in accordance with various aspects of the disclosed approach for managing multi-hop relay network.

FIG. 14 shows an exemplary functional block diagram of a wireless device 1400 that may be employed within the wireless communication system 200 of FIG. 2. The wireless device 1400 is an example of a device that may be configured to implement the various methods described herein. For example, the wireless device 1400 may comprise the AP, one of the STAs, and/or one of the relays in FIG. 2.

The wireless device 1400 may include a housing 1410 that may include a processor 1420 which controls operation of the wireless device 1400. The processor 1420 may also be referred to as a central processing unit (CPU). Memory 1422, which may include both read-only memory (ROM) and random access memory (RAM), may provide instructions and data to the processor 1420. A portion of the memory 1422 may also include non-volatile random access memory (NVRAM). The processor 1420 typically performs logical and arithmetic operations based on program instructions stored within the memory 1422. The instructions in the memory 1422 may be executable to implement the methods described herein.

The processor 1420 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine- or computer-readable media, such the memory 1422 for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 1400 may also include a transmitter 1432 and/or a receiver 1434 to allow transmission and reception of data between the wireless device 1400 and a remote location. The transmitter 1432 and receiver 1434 may be combined into a transceiver 1430. An antenna 1402 may be attached to the housing 1410 and electrically coupled to the transceiver 1430. The wireless device 1400 may also include (not shown) multiple transmitters, multiple receivers, multiple transceivers, and/or multiple antennas. In one aspect of the disclosed approach, and as further discussed herein, the transmitter 1432 may include a notification generation module, illustrated as a notification generator 1436. Also, the receiver 1434 may include an event detection module, illustrated as an event detector 1438*a*; and a notification detection module, illustrated as a notification detector 1438*b*.

The wireless device 1400 may also include a signal detector 1426 that may be used in an effort to detect and quantify the level of signals received by the transceiver 1430. The signal detector 1426 may detect such signals as total energy, energy per subcarrier per symbol, power spectral density and other signals. The wireless device 1400 may also include a DSP 1440 for use in processing signals. The DSP 1440 may be configured to generate a packet for transmission. In some aspects, the packet may comprise a physical layer data unit (PPDU).

The wireless device 1400 may further comprise a user interface 1424 in some aspects. The user interface 1424 may comprise a keypad, a microphone, a speaker, and/or a display. The user interface 1424 may include any element or component that can convey information to a user of the wireless device 1400 and/or receives input from the user.

The various components of the wireless device 1400 may be coupled together by a bus system 1412. The bus system 1412 may include a data bus, for example, as well as a power bus, a control signal bus, and a status signal bus in addition to the data bus. Those of skill in the art will appreciate the components of the wireless device 1400 may be coupled together or accept or provide inputs to each other using some other mechanism.

Although a number of separate components are illustrated in FIG. 14, those of skill in the art will recognize that one or more of the components may be combined or commonly implemented. For example, the processor 1420 may be used to implement not only the functionality described above with respect to the processor 1420, but also to implement the functionality described above with respect to the signal detector 1426 and/or the DSP 1440. As another example, the processor 1420 may implement some of the functionality of the transmitter 1432, such as the functionality associated with the notification generator 1436; as well as some of the functionality of the receiver 1434, such as the functionality associated with the event detector 1438a. Further, each of the components illustrated in FIG. 14 may be implemented using a plurality of separate elements.

The wireless device 1400 may comprise an AP, a STA, or a relay, and may be used to transmit and/or receive communications. That is, an AP, STA, or relay may serve as transmitter or receiver devices. Certain aspects contemplate the signal detector 1426 being used by software running on the memory 1422 and the processor 1420 to detect the presence of a transmitter or receiver.

Figure 15:
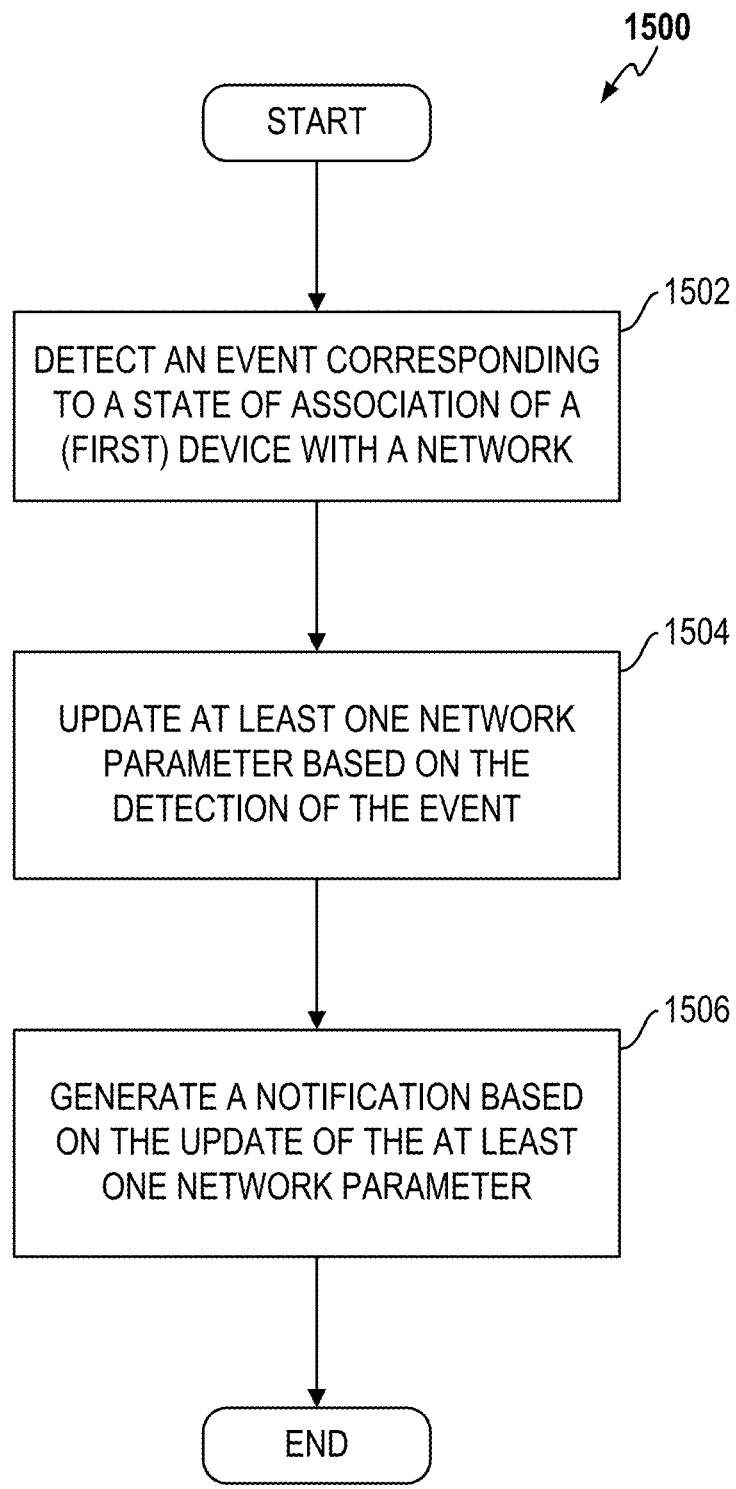
FIG. 15 is a flowchart of a process for performing wireless communications of the wireless communications system of FIG. 2 configured in accordance with various aspects of the disclosed approach for managing multi-hop relay networks, wherein a relay may generate an update based on a detection of an association/disassociation event of a device in a multi-hop relay network.

FIG. 15 illustrates a multi-hop relay network management process 1500 that may be performed by an AP or relay such as the various relays or the AP of FIG. 2, including the relay B1 230-1, the relay B2 230-2, or the relay D 250. The example provided in FIG. 2 may be used in the description of the multi-hop relay network management process 1500. To simplify the discussion herein, reference to relays should be understood to apply to AP's as well. At 1502, an apparatus such as the relay may detect an event corresponding to a state of association of a device, such as a first device in a plurality of devices, with the network. In accordance with various aspects of the disclosed approach, the event may include an Association Request frame from the device, or a receipt or not of a frame from the device within the $T_{Detect}$ period of time.

In one aspect of the disclosed approach, the Association Request frame includes the Relay_Address_Reachable IE, which includes association information about the relays and STAs reachable through the apparatus. The association information may include network parameters such as addresses corresponding to these devices as well as an original time of attachment for each device to the BSS, stored using a timestamp. The attachment may be due to a successful attachment operation of the device to the apparatus. As described above, the apparatus may broadcast the beacon for the BSS and authorize association requests from devices after the apparatus had previously associated with the network.

The $T_{Detect}$ period of time may generally be referred to as a disassociation determination period, where it may be determined how much time has elapsed before a frame has been received from the apparatus. As discussed above, a relay or an AP may remove an address of a device from which it has not received any communication after the disassociation determination period to allow removal of stale and/or inaccurate entries from forwarding tables. Further, detection of the association event may include receiving a signal or notification of the Association Request frame or an expiry of a timer corresponding to the disassociation determination period.

At 1504, the relay may update at least one network parameter based on the detection of the event. For example, where the association event includes the association request frame, the relay may assign a timestamp to the addresses in the Relay_Address_Reachable IE. In one aspect of the disclosure, the timestamps that are originally received in the Relay_Address_Reachable IE from the apparatus may be selectively updated. In another aspect of the disclosed approach, where the association event is a disassociation, such as where the relay has determined the apparatus has lost connectivity to the BSS, no timestamp may be assigned to the disassociation event as the forwarding table of the relay may simply be updated to remove the entry corresponding to the apparatus with a need to change the timestamp.

At 1506, the relay may generate a notification based on the update of the at least one network parameter. In one aspect of the disclosed approach, this is a routing update based on the assignment of the timestamp. For example, the relay may generate a disassociation update upon detecting that no message is received from the apparatus within the predetermined period of time, wherein the disassociation update comprises an update message configured to cause a removal of the one or more device identifiers in a forwarding table at a recipient device. The relay may transmit the routing update to another apparatus, such as an upstream device configured to forward data to the apparatus based on the routing update. The routing update includes an update message configured to cause an update in a forwarding table on a recipient device.

Figure 16:
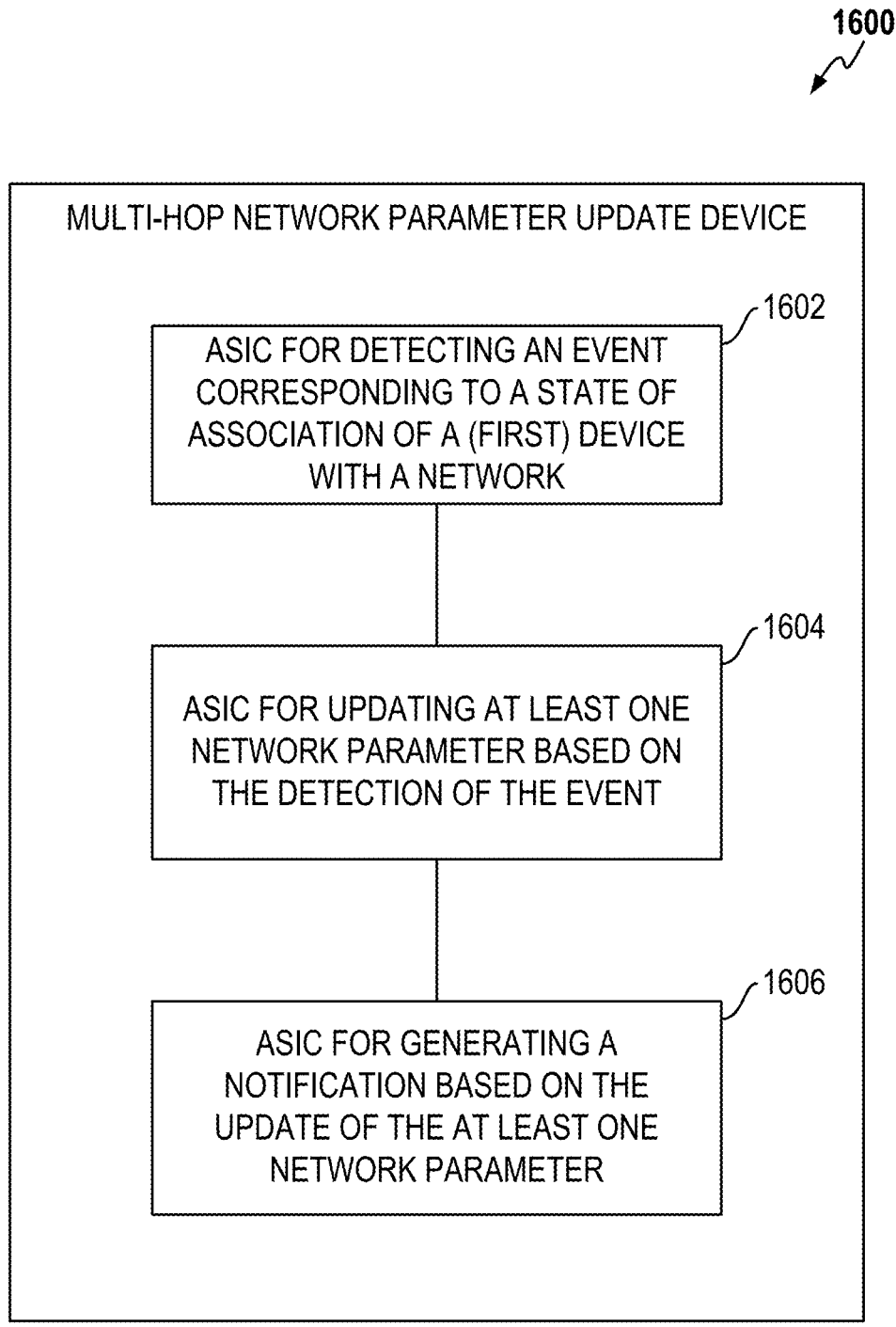
FIG. 16 is a functional block diagram of an exemplary device that may be employed within the wireless communications system of FIG. 2, configured in accordance with various aspects of the disclosed approach for managing multi-hop relay networks with reference to FIG. 15.

The components described herein may be implemented in a variety of ways. Referring to FIG. 16, a multi-hop network parameter update apparatus 1600 is represented as a series of interrelated functional blocks that represent functions implemented by, for example, one or more integrated circuits such as an application specific integrated circuit (ASIC) or implemented in some other manner as described herein. As further discussed herein, an integrated circuit may include a processor, software, other components, or some combination thereof.

The apparatus 1600 includes one or more modules that may perform one or more of the functions described above with regard to various figures. For example, an ASIC for detecting an event corresponding to a state of association of a device, such as a first device in a plurality of devices, with a network 1602 may correspond to, for example, a receiver working with a processing system as discussed herein. Referring to FIG. 14, this ASIC may be implemented as the event detector 1438a, with various aspects of its functionality described at 1502 in FIG. 15. An ASIC for updating at least one network parameter based on the detection of the event 1604 may correspond to, for example, a processing system as discussed herein. Referring again to FIG. 14, this ASIC may be implemented as the processor 1420, with various aspects of its functionality described at 1504 in FIG. 15. An ASIC for generating a notification based on the update of the at least one network parameter 1606 may correspond to, for example, a processing system as discussed herein. The apparatus 1600 may then transmit the notification to another, second device such as another relay or an AP, where the second device may be configured to forward data to the first device based on the information contained in the notification. Referring yet again to FIG. 14, this ASIC may be implemented as the notification generator 1436, with various aspects of its functionality described at 1506 in FIG. 15.

Figure 13:
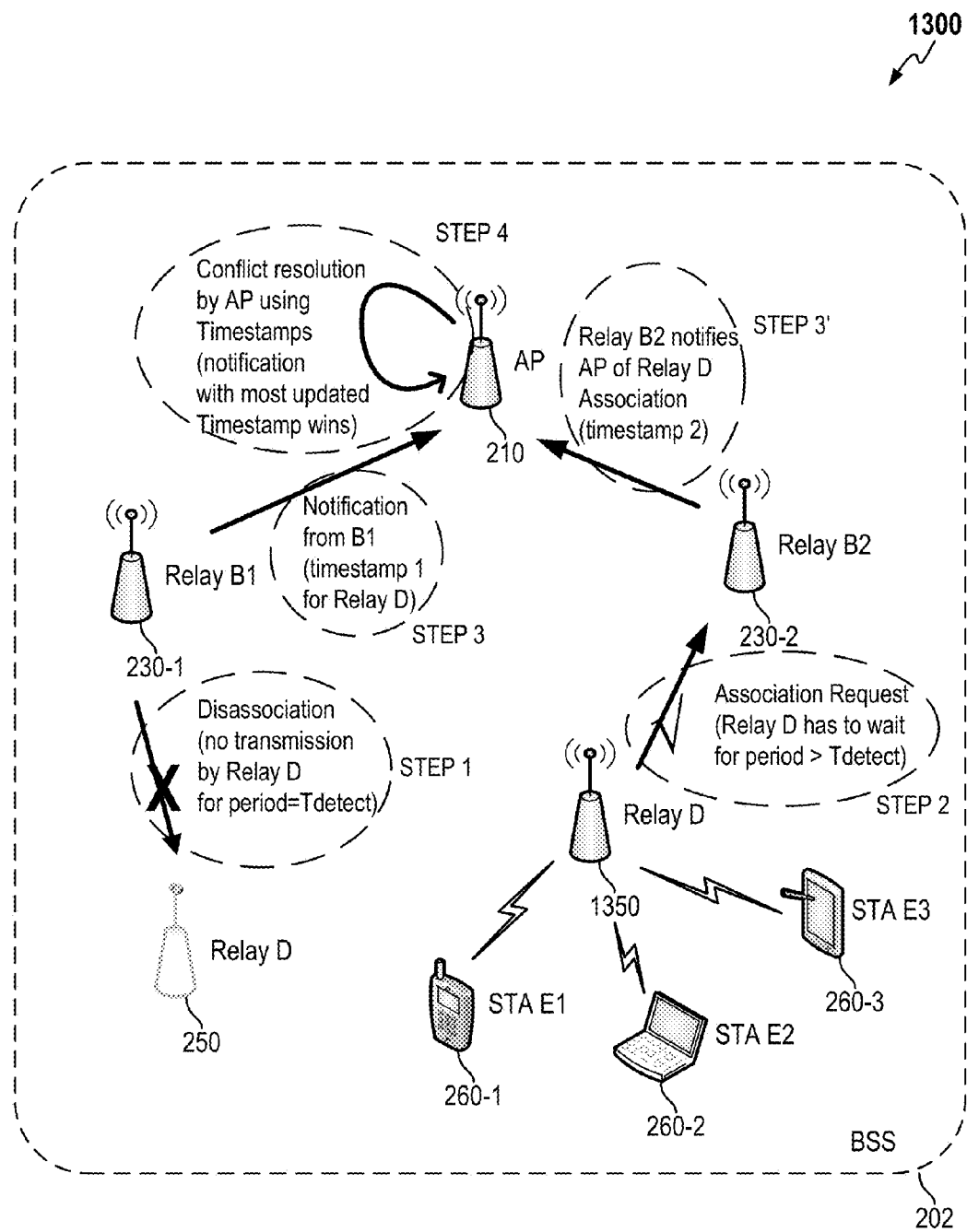
FIG. 13 is a diagram summarizing a conflict resolution process for update notification conflicts in the wireless communication system of FIG. 2 that may be used to illustrate the forwarding table management process of FIG. 12 for resolving conflicting forwarding table update notifications.
Figure 17:
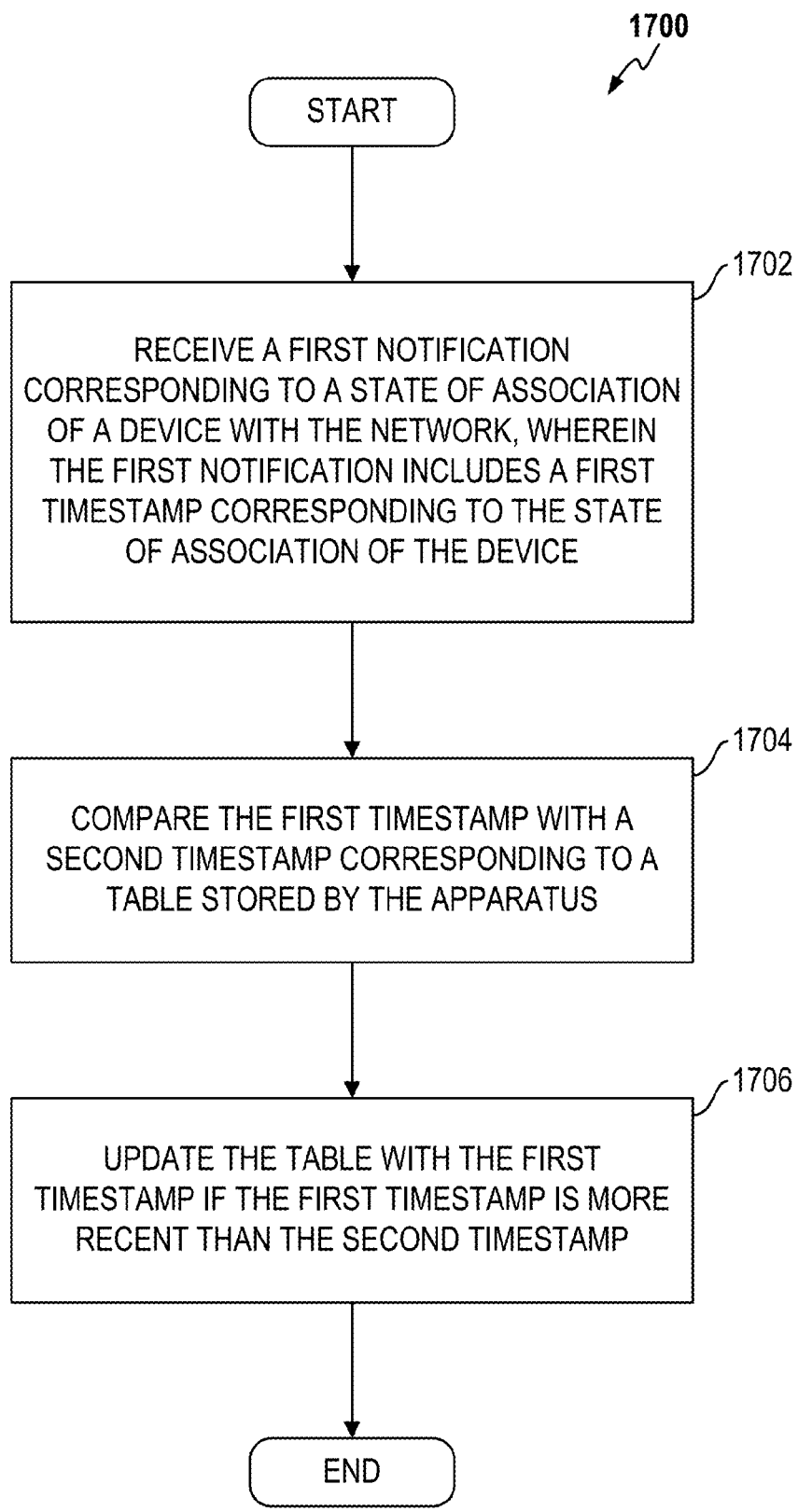
FIG. 17 is a flowchart of another process for performing wireless communications of the wireless communications system of FIG. 2 configured in accordance with various aspects of the disclosed approach for managing multi-hop relay networks, wherein a relay or an access point may resolve conflicting notifications based on a comparison of timestamp information in the notifications.

FIG. 17 illustrates a multi-hop relay network management process 1700 that may be performed by an AP or relays such as the AP or the various relays of FIG. 2. The example provided in FIG. 2 may be used in the description of the multi-hop relay network management process 1700. FIG. 13, which illustrates the scenario 1300 for resolution of the conflicting forwarding table update, may also be referred to herein to describe the multi-hop relay network management process 1700. To simplify the discussion herein, reference to the AP should be understood to apply to relays as well.

At 1702, the AP may receive a first notification corresponding to a state of association of a device, such as a first device of a plurality of devices, with the network, wherein the notification includes a first timestamp corresponding to the state of association of the device. In accordance with various aspects of the disclosed approach, the state of association may correspond to a relay such as the relay B1 230-1 or the relay B2 230-2: (1) receiving an Association Request frame from the device; or (2) receiving or not of a frame from the device within the $T_{Detect}$ period of time. The AP 210 may receive the notification from the relay B1 230-1 or the relay B2 230-2.

In one aspect of the disclosed approach, the Association Request frame includes the Relay_Address_Reachable IE, which includes association information about the relays and STAs—one of which is the device—reachable through the relay. The association information may include network parameters such as addresses corresponding to these devices as well as an original time of attachment for each device to the BSS, stored using a timestamp such as the first timestamp for the device. The attachment may be due to a successful attachment operation of the device to the relay. As described above, the relay may broadcast the beacon for the BSS and authorize association requests from devices after the relay had previously associated with the network. For example, where the association event includes the association request frame, the relay may originally assign a timestamp to each of the addresses in the Relay_Address_Reachable IE.

The $T_{Detect}$ period of time may generally be referred to as a disassociation determination period, where it may be determined how much time has elapsed before a frame has been received from the apparatus. As discussed above, a relay or an AP may remove an address of a device from which it has not received any communication after the disassociation determination period to allow removal of stale and/or inaccurate entries from forwarding tables. Further, detection of the association event may include receiving a signal or notification of the Association Request frame or an expiry of a timer corresponding to the disassociation determination period.

At 1704, the AP may compare the first timestamp with a second timestamp corresponding to a table stored by the apparatus. In one aspect of the disclosed approach, the table may be a forwarding table and the second timestamp may be a timestamp for the device stored on the forwarding table. The AP may then compare the first timestamp received for the device from 1702 to the second timestamp.

At 1706, the AP may update the table with the first timestamp if the first timestamp is more recent than the second timestamp. In one aspect of the disclosure, the timestamps that are originally received in the Relay_Address_Reachable IE from the relay may be selectively updated if a more recently received timestamp is more recent than the timestamps in the table. For example, if the first timestamp received in 1702 is more recent than the second timestamp in the table. In another aspect of the disclosed approach, where the association event is a disassociation, such as where the relay has determined the relay has lost connectivity to the BSS, no timestamp may be assigned to the disassociation event as the forwarding table of the AP may simply be updated to remove the entry corresponding to the device with a need to change the timestamp.

In another example, the AP may update the forwarding table upon detecting that no message is received from the device within the predetermined period of time, wherein the disassociation update includes receiving an update message configured to cause a removal of one or more device identifiers in the forwarding table. The relay may transmit the routing update to an upstream apparatus configured to forward data to the relay based on the routing update, such as the AP.

Figure 18:
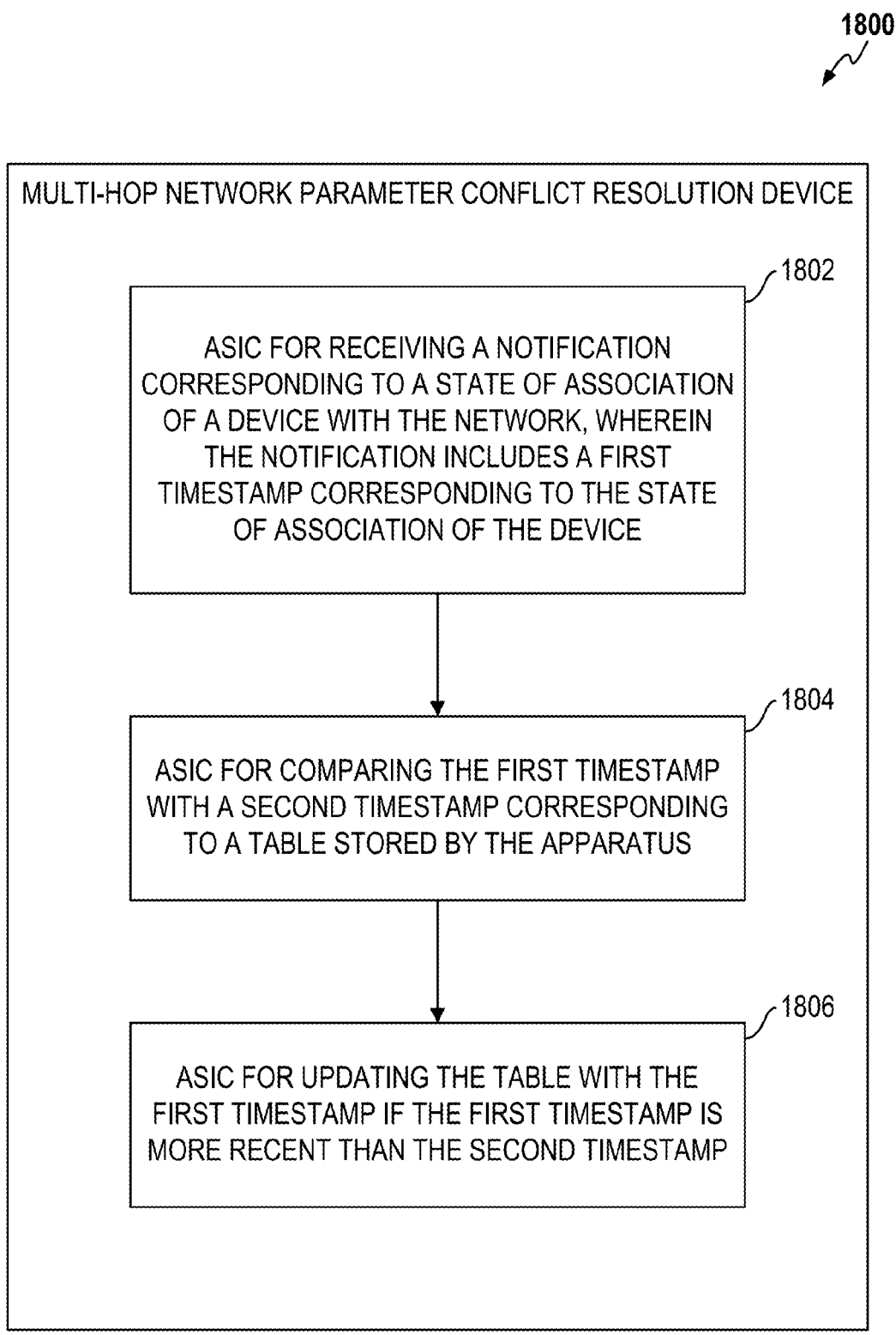
FIG. 18 is a functional block diagram of another exemplary device that may be employed within the wireless communications system of FIG. 2, configured in accordance with various aspects of the disclosed approach for managing multi-hop relay networks with reference to FIG. 17.

The components described herein may be implemented in a variety of ways. Referring to FIG. 18, an apparatus 1800 is represented as a series of interrelated functional blocks that represent functions implemented by, for example, one or more integrated circuits such as an application specific integrated circuit (ASIC) or implemented in some other manner as described herein. As further discussed herein, an integrated circuit may include a processor, software, other components, or some combination thereof.

The apparatus 1800 includes one or more modules that may perform one or more of the functions described above with regard to various figures. For example, an ASIC for receiving a notification corresponding to a state of association of a device, such as a first device of a plurality of devices, with the network, wherein the notification includes a first timestamp corresponding to the state of association of the device 1802 may correspond to, for example, a receiver working with a processing system as discussed herein. Referring to FIG. 14, this ASIC may be implemented as the notification detector 1438b, with various aspects of its functionality described at 1702 in FIG. 17. An ASIC for comparing the first timestamp with a second timestamp corresponding to a table stored by the apparatus 1804 may correspond to, for example, a processing system as discussed herein. Referring again to FIG. 14, this ASIC may be implemented as the processor 1420, with various aspects of its functionality described at 1704 in FIG. 17. An ASIC for updating the table with the first timestamp if the first timestamp is more recent than the second timestamp 1806 may correspond to, for example, a processing system as discussed herein. Referring still to FIG. 14, this ASIC may be implemented as the processor 1420, with various aspects of its functionality described at 1706 in FIG. 17.

As noted above, in some aspects these modules may be implemented via appropriate processor components or processing systems. These processing systems may in some aspects be implemented, at least in part, using structures or means as taught herein. In some aspects, a processing system may be configured to implement a portion or all of the functionality of one or more of these modules. Thus, the functionality of different modules may be implemented, for example, as different subsets of an integrated circuit, as different subsets of a set of software modules, or a combination thereof. Also, it should be appreciated that a given subset of, for example, an integrated circuit and/or of a set of software modules may provide at least a portion of the functionality for more than one module. In accordance with various aspects of the disclosure, one or more of any components represented by dashed boxes are optional.

In some aspects, an apparatus or any component of an apparatus may be configured to (or operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

As noted above, the apparatus 1600 and the apparatus 1800 comprise one or more integrated circuits in some implementations. For example, in some aspects a single integrated circuit implements the functionality of one or more of the illustrated components, while in other aspects more than one integrated circuit implements the functionality of one or more of the illustrated components. As one specific example, the apparatus 1600 may include a single device, an ASIC for example, with components 1602-1606 implementing different sections of the ASIC. As another specific example, the apparatus 1800 may also include a single device, an ASIC for example, with circuitry 1802-1806 implementing different sections of the ASIC. As yet another specific example, the apparatus 1600 may include several devices, for example, with the circuitry of 1602 being implemented in one ASIC and the circuitry 1604 and 1606 being implemented in another ASIC. As still yet another specific example, the apparatus 1800 may include several devices, for example, with the circuitry of 1802 being implemented in one ASIC and the circuitry 1804 and 1806 being implemented in another ASIC.

In addition, the components and functions represented by FIG. 16 as well as other components and functions described herein, such as those in FIG. 18 may be implemented using any suitable means. Such means are configured, at least in part, using corresponding structure as taught herein. For example, the components described above in conjunction with the "ASIC for" components of FIG. 16 and also FIG. 18 correspond to similarly designated "means for" functionality. Thus, one or more of such means may be implemented using one or more of the processor components, integrated circuits, or other suitable structure as taught herein in some implementations, and programmed to carry out one or more portions of any algorithms disclosed herein. Several examples follow.

In accordance with various aspects of the disclosure, any means for receiving may comprise a receiver such as the receiver 1434 of FIG. 14, and programmed to carry out step 1702 of the algorithm 1700 shown in FIG. 17. Also, any means for detecting or any means for determining, such as any means for detecting an association event for an apparatus with a network or any means for determining a lack of communication of a device with a network, respectively, may comprise a processing system that includes the processor 1420 of FIG. 14, and programmed to carry out step 1502 of the algorithm 1500 shown in FIG. 15, where the processing system may operate in conjunction with the receiver 1434. Further, any means for manipulating, updating, or changing a network parameter, which may include timestamps, such as any means for assigning a timestamp to the association event based on the detection of the association event; any means for adding a timestamp to a forwarding table; any means for updating a timestamp in a forwarding table; or any means for deleting a timestamp in a forwarding table, comprises a processing system such as the processor 1420 of FIG. 14, and programmed to carry out steps 1504 and 1706 of the algorithms 1500 and 1700 shown in FIG. 15 and FIG. 17, respectively. Further still, any means for comparing timestamps, such as comparing a timestamp received in any messages or notifications and a timestamp in a forwarding table, may comprise a processing system that includes the processor 1420 of FIG. 14, and programmed to carry out step 1704 of the algorithm 1700 shown in FIG. 17. Yet further still, any means for generating a routing update based on the assignment of the timestamp comprises a processing system that includes the processor 1420 of FIG. 14, and programmed to carry out step 1506 of the algorithm 1500 shown in FIG. 15, where the processing system may operate in conjunction with the transmitter 1432. Yet further still, any means for transmitting comprises a transmitter such as the transmitter 1432 of FIG. 14, and programmed to transmit the notification of routing update for step 1506 of the algorithm 1500 shown in FIG. 15, respectively.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit (IC), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes (e.g., executable by at least one computer) relating to one or more of the aspects of the disclosure. In some aspects a computer program product may comprise packaging materials.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-Ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Also, it should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Unless specifically stated otherwise, the term "some" refers to one or more. A phrase referring to "at least one of" a list of items refers to any combination of those items, including single members. As an example, "at least one of: A, B, or C" is intended to cover: A; B; C; A and B; A and C; B and C; and A, B and C.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communication for an apparatus associated with a network comprising:
   initializing, by the apparatus, a table that includes one or more network parameters;
   detecting, by the apparatus, a disassociation event of a first device with the network, wherein the disassociation event is detected if no communication is received from the first device during a first time period;
   prohibiting the first device from re-associating with the network during the first time period to avoid a race-condition in order to ensure consistency of the table;
   updating, by the apparatus, at least one network parameter in the table based on the detection of the disassociation event; and
   generating, by the apparatus, a notification based on the update of the at least one network parameter.

2. The method of claim 1, further comprising outputting via an interface of the apparatus, the notification to a second device previously configured to forward data to the first device through the apparatus.

3. The method of claim 1, further comprising receiving, by the apparatus, a message comprising information corresponding to a state of association of the first device.

4. The method of claim 3, wherein the message comprises an association request for the network from the first device.

5. The method of claim 3, wherein the information comprises a timestamp corresponding to a time the first device is associated with the network.

6. The method of claim 5, wherein the update of the at least one network parameter comprises adding the timestamp to the table in the apparatus.

7. The method of claim 6, where the addition of the timestamp comprises:
   comparing the timestamp in the message and an existing timestamp in the table corresponding to the first device; and updating the existing timestamp based on the timestamp in the message if the timestamp is more recent than the existing timestamp.

8. The method of claim 1, wherein the update of the at least one network parameter comprises deleting a timestamp associated with the first device in the table in the apparatus after the period of time.

9. A method of wireless communication for an apparatus associated with a network comprising:
receiving, by the apparatus, a first notification corresponding to a state of association of a first device with the network, the first notification comprising a first timestamp corresponding to a time a disassociation event of the first device is detected when no communication is received from the first device for a first time period, during which the first device is prohibited from re-associating with the network to avoid a race-condition in order to ensure consistency of a table that includes one or more network parameters;
comparing, by the apparatus, the first timestamp with a second timestamp corresponding to the table stored by the apparatus; and
updating, by the apparatus, the table with the first timestamp if the first timestamp is more recent than the second timestamp.

10. The method of claim 9, wherein the second timestamp comprises a previously received timestamp from another notification previously received by the apparatus corresponding to a second state of association of the first device with the network.

11. The method of claim 9, further comprising outputting via an interface of the apparatus, a second notification to a second device previously configured to forward data to the first device through the apparatus based on the update of the table, wherein the second notification comprises the first timestamp if the first timestamp is more recent than the second timestamp.

12. The method of claim 9, wherein the first notification comprises a timestamp corresponds to a time of re-association of the first device with the network and the apparatus updates the table based on the time of re-association.

13. The method of claim 9, wherein the table is a table configured to allow the apparatus to determine how to route data to the first device.

14. An apparatus associated with a network, comprising:
means for initializing a table that includes one or more network parameters;
means for detecting a disassociation event of a first device with the network, wherein the disassociation event is detected if no communication is received from the first device during a first time period;
means for prohibiting the first device from re-associating with the network during the first time period to avoid a race-condition in order to ensure consistency of the table;
means for updating at least one network parameter in the table based on the detection of the disassociation event; and
means for generating a notification based on the update of the at least one network parameter.

15. The apparatus of claim 14, further comprising means for transmitting the notification to a second device previously configured to forward data to the first device through the apparatus.

16. The apparatus of claim 14, further comprising means for receiving a message comprising information corresponding to the state of association of the first device.

17. The apparatus of claim 16, wherein the message comprises an association request for the network from the first device.

18. The apparatus of claim 16, wherein the information comprises a timestamp corresponding to a time the first device is associated with the network.

19. The apparatus of claim 18, wherein the means for updating the at least one network parameter is configured to add the timestamp to the table in the apparatus.

20. The apparatus of claim 19, where the means for adding the timestamp is configured to:
compare the timestamp in the message and an existing timestamp in the table corresponding to the first device; and
update the existing timestamp based on the timestamp in the message if the timestamp is more recent than the existing timestamp.

21. The apparatus of claim 16, wherein the means for updating the at least one network parameter is configured to delete a timestamp associated with the first device in the table in the apparatus after the period of time.

22. An apparatus associated with a network comprising:
means for receiving a first notification corresponding to a state of association of a first device with the network, the first notification comprising a first timestamp corresponding to a time a disassociation event of the first device is detected when no communication is received from the first device for a first time period, during which the first device is prohibited from re-associating with the network to avoid a race-condition in order to ensure consistency of a table that includes one or more network parameters;
means for comparing the first timestamp with a second timestamp corresponding to the table stored by the apparatus; and
means for updating the table with the first timestamp if the first timestamp is more recent than the second timestamp.

23. The apparatus of claim 22, wherein the second timestamp comprises a previously received timestamp from another notification previously received by the apparatus corresponding to a second state of association of the first device with the network.

24. The apparatus of claim 22, further comprising means for transmitting a second notification to a second device previously configured to forward data to the first device through the apparatus based on the update of the table, wherein the second notification comprises the first timestamp if the first timestamp is more recent than the second timestamp.

25. The apparatus of claim 22, wherein the first notification comprises a timestamp corresponds to a time of re-association of the first device with the network and the apparatus updates the table based on the time of re-association.

26. The apparatus of claim 22, wherein the table is a table configured to allow the apparatus to determine how to route data to the first device.

27. A non-transitory computer-readable storage medium comprising instructions executable by an apparatus associated with a network for:
initializing, by the apparatus, a table that includes one or more network parameters;
detecting, by the apparatus, a disassociation event of a first device with the network, wherein the disassociation event is detected if no communication is received from the first device during a first time period;

prohibiting the first device from re-associating with the network during the first time period to avoid a race-condition in order to ensure consistency of the table;

updating, by the apparatus, at least one network parameter in the table based on the detection of the disassociation event; and generating, by the apparatus, a notification based on the update of the at least one network parameter.

28. A non-transitory computer-readable storage medium comprising instructions executable by an apparatus associated with a network for:

receiving, by the apparatus, a first notification corresponding to a state of association of a first device with the network, the first notification comprising a first timestamp corresponding to a time a disassociation event of the first device is detected when no communication is received from the first device for a first time period, during which the first device is prohibited from re-associating with the network to avoid a race-condition in order to ensure consistency of a table that includes one or more network parameters;

comparing, by the apparatus, the first timestamp with a second timestamp corresponding to the table stored by the apparatus; and updating, by the apparatus, the table with the first timestamp if the first timestamp is more recent than the second timestamp.

29. An apparatus associated with a network comprising:
a processing system configured to:
initialize a table that includes one or more network parameters;
detect a disassociation event of a first device with the network, wherein the disassociation event is detected if no communication is received from the first device during a first time period;
prohibit the first device from re-associating with the network during the first time period to avoid a race-condition in order to ensure consistency of the table;
update at least one network parameter in the table based on the detection of the disassociation event; and
generate a notification based on the update of the at least one network parameter.

30. The apparatus of claim 29, further comprising an interface configured to output the notification for transmission to a second device previously configured to forward data to the first device through the apparatus.

31. The apparatus of claim 29, further comprising an interface configured to obtain a message comprising information corresponding to the state of association of the first device.

32. The apparatus of claim 31, wherein the message comprises an association request for the network from the first device.

33. The apparatus of claim 31, wherein the information comprises a timestamp corresponding to a time the first device is associated with the network.

34. The apparatus of claim 33, wherein the processing system is further configured to add the timestamp to the table in the apparatus.

35. The apparatus of claim 34, where the processing system is further configured to:
compare the timestamp in the message and an existing timestamp in the table corresponding to the first device; and
update the existing timestamp based on the timestamp in the message if the timestamp is more recent than the existing timestamp.

36. The apparatus of claim 29, wherein the processing system is further configured to delete a timestamp associated with the first device in the table in the apparatus after the period of time.

37. An apparatus associated with a network comprising:
an interface configured to obtain a first notification corresponding to a state of association of a first device with the network, the first notification comprising a first timestamp corresponding to a time a disassociation event of the first device is detected when no communication is received from the first device for a first time period, during which the first device is prohibited from re-associating with the network to avoid a race-condition in order to ensure consistency of a table that includes one or more network parameters; and
a processing system coupled to the receiver, wherein the processing system is configured to:
compare the first timestamp with a second timestamp corresponding to the table stored by the apparatus; and
update the table with the first timestamp if the first timestamp is more recent than the second timestamp.

38. The apparatus of claim 37, wherein the second timestamp comprises a previously obtained timestamp from another notification previously obtained by the apparatus corresponding to a second state of association of the first device with the network.

39. The apparatus of claim 37, further comprising an interface configured to output a second notification for transmission to a second device previously configured to forward data to the first device through the apparatus based on the update of the table, wherein the second notification comprises the first timestamp if the first timestamp is more recent than the second timestamp.

40. The apparatus of claim 37, wherein the first notification comprises a timestamp corresponds to a time of re-association of the first device with the network and the processing system updates the table based on the time of re-association.

41. The apparatus of claim 37, wherein the table is a table configured to allow the apparatus to determine how to route data to the first device.

42. A relay associated with a network comprising:
a processing system configured to:
initialize a table that includes one or more network parameters;
detect a disassociation event of a first device with the network, wherein the disassociation event is detected if no communication is received from the first device during a first time period;
prohibit the first device from re-associating with the network during the first time period to avoid a race-condition in order to ensure consistency of the table;
update at least one network parameter in the table based on the detection of the disassociation event;
generate a notification based on the update of the at least one network parameter; and
a transmitter configured to transmit the notification.

43. A relay associated with a network comprising:
an antenna;
a receiver coupled to the antenna and configured to receive, via the antenna, a first notification corresponding to a state of association of a first device with the network, the first notification comprising a first timestamp corresponding to a time a disassociation event of the first device is detected when no communication is received from the first device for a first time period, during which the first device is prohibited from re-associating with the network to avoid a race-condition in order to ensure consistency of a table that includes one or more network parameters; and a processing system configured to:

compare the first timestamp with a second timestamp corresponding to the table stored by the relay; and update the table with the first timestamp if the first timestamp is more recent than the second timestamp.

\* \* \* \* \*